(12) United States Patent
Nagamiya et al.

(10) Patent No.: US 6,332,901 B1
(45) Date of Patent: Dec. 25, 2001

(54) CARBON MONOXIDE REDUCING DEVICE FOR REDUCING CARBON MONOXIDE IN A REFORMATE GAS

(75) Inventors: Kiyomi Nagamiya, Toyota; Masashi Yamashita, Aichi-ken; Iwao Maeda, Nagoya; Masaaki Yamaoka, Toyota; Masayoshi Taki, Kounan; Satoshi Aoyama, Susono; Yasushi Araki, Gotenba, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/394,909

(22) Filed: Sep. 13, 1999

(30) Foreign Application Priority Data

| Oct. 12, 1998 | (JP) | 10-289894 |
|---|---|---|
| Nov. 18, 1998 | (JP) | 10-328613 |
| Feb. 9, 1999 | (JP) | 11-032002 |

(51) Int. Cl.[7] .............. B01J 8/00; C10K 1/00; G05B 1/00

(52) U.S. Cl. ............ 48/127.9; 48/128; 422/105; 422/108; 422/172; 422/190

(58) Field of Search .............. 48/76, 127.9, 128, 48/198.3; 422/105, 107, 108, 110, 112, 116, 172, 190, 168–171, 187–189; 73/199; 429/13, 17, 19

(56) References Cited

U.S. PATENT DOCUMENTS

| 3,216,782 | * | 11/1965 | Cohn | 423/247 |
| 4,046,956 | * | 9/1977 | Fanciullo | 429/20 |
| 5,141,823 | * | 8/1992 | Wright et al. | 429/19 |
| 5,330,727 | * | 7/1994 | Trocciola et al. | 422/177 |
| 5,518,705 | * | 5/1996 | Buswell et al. | 423/437.2 |
| 5,637,415 | * | 6/1997 | Meltser et al. | 429/17 |
| 5,648,182 | * | 7/1997 | Hara et al. | 429/20 |
| 5,658,681 | * | 8/1997 | Sato et al. | 429/13 |
| 5,712,052 | * | 1/1998 | Kawatsu | 429/13 |

FOREIGN PATENT DOCUMENTS

| 0 833 401 A2 | 4/1998 | (EP) . |
| 0 834 948 A2 | 4/1998 | (EP) . |
| A-8-106914 | 4/1996 | (JP) . |
| A-8-133702 | 5/1996 | (JP) . |
| A-8-329969 | 12/1996 | (JP) . |

* cited by examiner

Primary Examiner—Hien Tran
Assistant Examiner—Alexa A. Doroshenk
(74) Attorney, Agent, or Firm—Oliff & Berridge, PLC

(57) ABSTRACT

A carbon monoxide reducing device supplies oxygen to a reformate gas obtained through a reforming reaction so as to oxidize carbon monoxide contained in the reformate gas by means of the oxygen and thereby reduces a concentration of carbon monoxide contained in the reformate gas. This carbon monoxide reducing device is equipped with an oxygen supply amount controller designed to oxidize CO. The oxygen supply amount controller controls an amount of oxygen supplied to oxidize carbon monoxide contained in the reformate gas based on an amount of supply of fuel contributing to the reforming reaction. Thereby, the amount of oxygen for oxidizing carbon monoxide contained in the reformate gas is adjusted appropriately, and a high-quality reformate gas can be obtained.

7 Claims, 13 Drawing Sheets

RELATED WORK

RELATED WORK

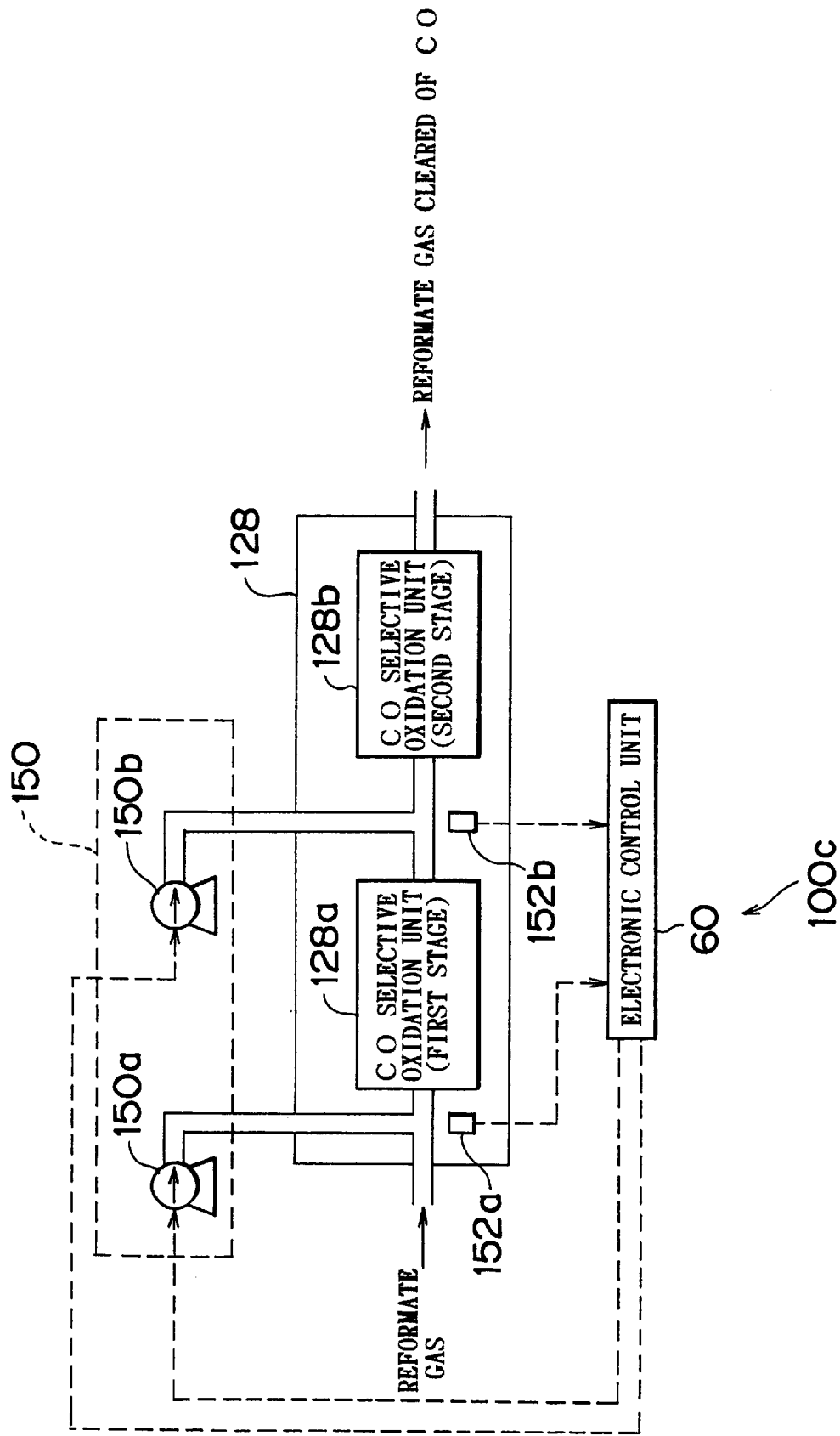

IN THE CASE WHERE REFORMATE GAS SUPPLIED TO C O SELECTIVE OXIDATION PORTION 128 CONTAINS HIGH CONCENTRATION OF C O (FOR EXAMPLE, C O CONCENTRATION=5%)

IN THE CASE WHERE REFORMATE GAS SUPPLIED TO C O SELECTIVE OXIDATION PORTION 128 CONTAINS LOW CONCENTRATION OF C O (FOR EXAMPLE, C O CONCENTRATION=1%)

CARBON MONOXIDE REDUCING DEVICE FOR REDUCING CARBON MONOXIDE IN A REFORMATE GAS

BACKGROUND OF THE INVENTION

1. Field of the Invention

The present invention relates to a device for reducing a concentration of carbon monoxide contained in reformate gas that has been obtained through reformation of a hydrocarbon such as methyl alcohol and a fuel such as water vapor. The present invention also related to a carbon monoxide reducing method.

2. Description of Related Art

As a system using this type of reformate gas, there is known a system that employs a fuel cell. For example, a typical fuel cell employing an electrolyte film permeable to protons is designed to electrochemically oxidize fuel, such as hydrogen gas, and to take out an electromotive power generated during the process.

A reformer that is used in such a system equipped with this fuel cell is designed, for example, to supply a reforming catalyst with methanol and water vapor and to obtain a reformate gas therefrom composed mainly of hydrogen, through a reforming reaction under a predetermined temperature. Basically, the reforming reaction is an endothermic reaction in which 1 mole of methanol reacts with 1 mole of water to produce 3 moles of hydrogen and 1 mole of carbon dioxide. However, a small amount of carbon monoxide is inevitably generated. The reaction is expressed by the formula (i) shown below.

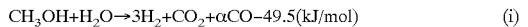

$$CH_3OH + H_2O \rightarrow 3H_2 + CO_2 + \alpha CO - 49.5 (kJ/mol) \quad (i)$$

In the case where reformate gas is used as a fuel gas for a fuel cell, platinum is employed as a catalyst for electrodes of the fuel cell. Therefore, if the fuel gas or reformate gas contains carbon monoxide, the carbon monoxide poisons and deteriorates the platinum. For this reason, it is preferable to gradually remove carbon monoxide from the reformate gas. Various methods for removing carbon monoxide from the reformate gas are known in the art. For example, Japanese Patent Application Laid-Open No. HEI 8-329969 discloses a device wherein an oxidation portion for oxidizing carbon monoxide contained in the reformate gas is disposed between a reforming portion for causing a reforming reaction and a fuel cell. In this device, the concentration of carbon monoxide is detected in a reformate gas feed path extending from the reformer to the fuel cell. If the concentration has become equal to or greater than a predetermined level, the amount of air supplied to the oxidation portion is increased.

In the aforementioned device of the related art, the carbon monoxide contained in the reformate gas reacts with oxygen contained in the air at an oxidation catalyst of the oxidation portion and is converted to carbon dioxide, which is not harmful to the platinum. In this manner, carbon monoxide is removed from the reformate gas. However, according to the aforementioned device of the related art, although the amount of air blown into the oxidation portion is increased with increases in concentration of carbon monoxide contained in the reformate gas, that amount of air may not always be suited for an actual amount of carbon monoxide.

That is, in principle, 1 mole of carbon monoxide reacts with 1/2 mole of oxygen to produce 1 mole of carbon dioxide. Therefore, if the amount of air supplied to the oxidation portion is insufficient with respect to an amount of carbon monoxide contained in the reformate gas, not all of the carbon monoxide is converted to carbon dioxide, and unreacted carbon monoxide is supplied to the fuel cell and poisons the platinum catalyst. Conversely, if an excessive amount of air is supplied to the oxidation portion, surplus oxygen is supplied to the fuel cell together with the reformate gas. As a result, the fuel gas for the fuel cell may burn instead of being used to generate electric power. However, in the device of the related art wherein the amount of air blown into the oxidation portion is increased simply based on a detected concentration of carbon monoxide, no effective measures may be taken to address or eliminate these problems.

SUMMARY OF THE INVENTION

The present invention has been made in light of the aforementioned circumstances, and it is an object of the present invention to provide a device capable of suitably removing carbon monoxide from reformate gas.

In order to achieve the above-stated and other objects, according to a first embodiment of the present invention, there is provided a carbon monoxide reducing device including a carbon monoxide oxidation portion, an oxygen supplying device, and an oxygen supply amount controller. The carbon monoxide oxidation portion oxidizes and thereby reduces carbon monoxide contained in reformate gas that is obtained through a reforming reaction. The oxygen supplying device supplies oxygen to the reformate gas so as to oxidize the carbon monoxide contained in the reformate gas. The first oxygen supply amount controller controls an amount of oxygen supplied to the reformate gas based on an amount of fuel contributing to a reforming reaction.

Thus, according to the first embodiment of the present invention, the amount of oxygen supplied to oxidize carbon monoxide is changed in accordance with an amount of fuel contributing to a reforming reaction. In other words, as the reforming reaction proceeds, carbon monoxide is generated at a certain rate and reacts with oxygen with a predetermined efficiency. Hence, the amount of supply of oxygen is determined in accordance with an amount of reformate fuel, whereby the amount of oxygen is set to a value matching the amount of carbon monoxide produced in the reforming reaction.

Further, in other embodiments, there may be provided a response delay-based adjuster in the oxygen supply amount controller that adjusts the amount of oxygen, which is supplied so as to oxidize the carbon monoxide, based on a response delay from supply of the fuel to generation of the reformate gas.

The response delay-based adjuster makes it possible to reflect a response delay of the reforming reaction on the amount of oxygen supplied to oxidize carbon monoxide. Therefore, the concentration of oxygen is prevented from becoming too high or too low at a location where carbon monoxide reacts with the oxygen. Consequently, the concentration of carbon monoxide contained in the reformate gas can be reduced effectively.

Further, there may be provided a concentration-based adjuster in the oxygen supply amount controller that adjusts the amount of oxygen, which is supplied so as to oxidize the carbon monoxide, based on a concentration of carbon monoxide flowing out of the carbon monoxide oxidation portion.

The concentration-based adjuster makes it possible to reflect a target concentration of carbon monoxide contained in the reformate gas on the amount of supply of oxygen. Therefore, the amount of oxygen supplied to oxidize and remove carbon monoxide can be set with higher precision. As a result, the quality of the reformate gas obtained can be improved.

Further, there may be provided a temperature-based adjuster in the oxygen supply amount controller that adjusts the amount of oxygen based on a temperature of the carbon monoxide oxidation portion.

The temperature-based adjuster makes it possible to reflect a temperature of the carbon monoxide oxidation portion where carbon monoxide is oxidized on the amount of supply of oxygen. Therefore, for example, if the oxidation of carbon monoxide or the like causes an extraordinary rise in temperature, the amount of supply of oxygen can be limited. As a result, it is possible to prevent the CO oxidation portion from abnormally deteriorating because of heat.

Still further, there may be provided a pressure-based adjuster in the oxygen supply amount controller that adjusts a command value for setting the amount of oxygen supplied from the oxygen supplying device, based on a quantity associated with a pressure in the carbon monoxide oxidation portion.

The pressure-based adjuster adjusts a command value for the oxygen supplying device in accordance with a pressure of oxygen supplied to the carbon monoxide oxidation portion. Therefore, even when the pressure in the carbon monoxide oxidation portion is high, a necessary amount of oxygen is supplied to the carbon monoxide oxidation portion. Conversely, when the pressure in the carbon monoxide oxidation portion is low, the command value is reduced to prevent an excessive amount of oxygen from being supplied. Consequently, the amount of oxygen supplied to oxidize carbon monoxide is adjusted appropriately.

Further, according to a further embodiment of the present invention, there is provided a carbon monoxide reducing device including a carbon monoxide oxidation portion, an oxygen supplying device and an oxygen supply amount controller. The carbon monoxide oxidation portion oxidizes and thereby reduces carbon monoxide gas contained in the reformate gas that is obtained through a reforming reaction. The oxygen supplying device supplies oxygen to the reformate gas so as to oxidize the carbon monoxide contained in the reformate gas. The oxygen supply amount controller controls a status of supply oxygen to the carbon monoxide oxidation portion based on an amount of the reformate gas supplied to the carbon monoxide oxidation portion.

This further embodiment of the present invention makes it possible to simplify a temperature control operation for the carbon monoxide oxidation portion that determines a response performance of the reaction for oxidizing carbon monoxide, and makes it possible to continuously control the oxygen reaction.

The status of supply oxygen to the carbon monoxide oxidation portion may be represented by a ratio between a concentration of oxygen and a concentration of carbon monoxide in the carbon monoxide oxidation portion. In this case, the amount of oxygen supplied to the carbon monoxide oxidation portion is controlled, whereby the ratio between the concentration of oxygen and the concentration of carbon monoxide in the carbon monoxide oxidation portion can easily be controlled.

Further, the oxygen supply controller may control an amount of oxygen supplied to the carbon monoxide oxidation portion such that the ratio of a concentration of oxygen to a concentration of carbon monoxide in the carbon monoxide oxidation portion increases with increases in amount of the reformate gas supplied to the carbon monoxide oxidation portion. In this case, even under the condition that the carbon monoxide oxidation portion is maintained at a constant temperature, the carbon monoxide oxidation reaction proceeds in accordance with an increase in amount of reformate gas supplied to the carbon monoxide oxidation portion. The O/CO ratio (the ratio of oxygen to carbon monoxide) is always greater than 1 and the degree of excess of oxygen increases in proportion to an amount of reformate gas. Therefore, even if the amount of reformate gas has increased, the oxidation of carbon monoxide can be carried out sufficiently under a constant temperature. Thus, it is possible to carry out oxidation of carbon monoxide in accordance with an amount of reformate gas, while maintaining the carbon monoxide oxidation portion at a constant temperature.

Further, the status of supply oxygen to the carbon monoxide oxidation portion may be represented by a pressure in the carbon monoxide oxidation portion. The oxygen controller may be designed to control a pressure in the carbon monoxide oxidation portion such that the pressure in the carbon monoxide oxidation portion increases with increases in amount of the reformate gas supplied to the carbon monoxide oxidation portion. In this case, if the pressure in the carbon monoxide oxidation portion becomes high, the length of time when carbon monoxide is in contact with the catalyst is increased. Therefor the carbon monoxide oxidation reaction proceeds despite changes in pressure. Consequently, even under the condition that the carbon monoxide oxidation portion is maintained at a constant temperature, the carbon monoxide oxidation reaction proceeds in accordance with an increase in amount of reformate gas supplied to the carbon monoxide oxidation portion. Thus, it is possible to carry out oxidation of carbon monoxide in accordance with an amount of reformate gas, while maintaining the carbon monoxide oxidation portion at a constant temperature.

Further, if the amount of the reformate gas supplied to the carbon monoxide oxidation portion is smaller than a predetermined value, the oxygen supply controller may control an amount of oxygen supplied to the carbon monoxide oxidation portion such that the ratio of a concentration of oxygen to a concentration of carbon monoxide in the carbon monoxide oxidation portion increases with increases in amount of the reformate gas supplied to the carbon monoxide oxidation portion. If the amount of the reformate gas supplied to the carbon monoxide oxidation portion is greater than the predetermined value, the oxygen supply controller may control a pressure in the carbon monoxide oxidation portion such that the pressure in the carbon monoxide oxidation portion increases with increases in amount of the reformate gas supplied to the carbon monoxide oxidation portion. Such control makes it possible to realize an optimized carbon monoxide reducing device, which exhibits a high response performance when a low load is applied thereto and which provides a high efficiency in oxidizing carbon monoxide when a high load is applied thereto.

Further, the carbon monoxide oxidation portion may include a plurality of selective oxidation units disposed along a direction in which the reformate gas flows. Each of the selective oxidation units oxidizing carbon monoxide contained in the reformate gas. The oxygen supplying device may include a plurality of oxygen supplying units that are provided in correspondence with the selective oxidation units. The oxygen supplying units supply the respective selective oxidation units with oxygen together with the reformate gas. The oxygen supply controller may be designed to control amounts of oxygen supplied to the respective selective oxidation units in accordance with amounts of the reformate gas supplied to the respective selective oxidation units. Consequently, when the load is low, the efficiency in oxidizing carbon monoxide is enhanced, and surplus hydrogen is prevented from burning.

Further, the oxygen supply controller may be designed to control amounts of oxygen supplied to the respective selective oxidation units such that ratios between concentrations of oxygen and concentrations of carbon monoxide in at least two of the selective oxidation units differ from each other. As a result, after the oxidation of carbon monoxide has been carried out sufficiently in the upstream-side selective oxidation unit with an enhanced carbon monoxide oxidation efficiency, the effect resulting from a reverse shift reaction can be reduced in the downstream-side selective oxidation unit.

Further, the oxygen supply controller may be designed to control a catalytic temperature of at least one of the selective oxidation units in accordance with amounts of the reformate gas supplied to the respective selective oxidation units. In this manner, it is possible to carry out oxidation of carbon monoxide with a small amount of catalyst.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein:

FIG. 10 shows the construction of a carbon monoxide reducing device 100c according to a third embodiment of the present invention;

DETAILED DESCRIPTION OF PREFERRED EMBODIMENTS

Figure 2:
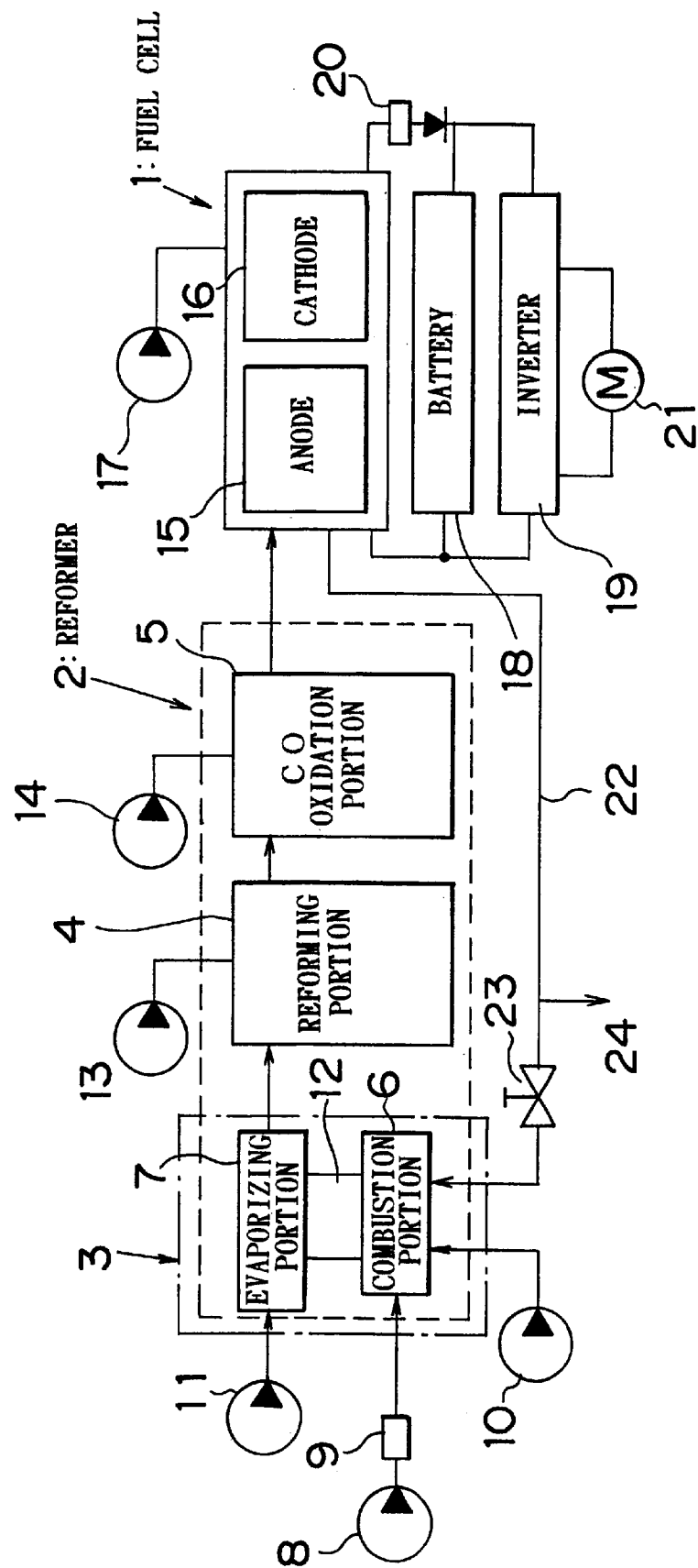
FIG. 2 schematically shows the overall construction of a system having a reformer connected to a fuel cell.

An embodiment of the present invention will now be described with reference to the accompanying drawings. First of all, a description will be made as to a system wherein a reformer that uses methanol and water vapor as a reformate fuel is employed, and wherein reformate gas generated in the reformer is converted to energy by means of a fuel cell. FIG. 2 schematically illustrates an example of such a system. In this system, a reformer 2 is connected to an anode side of a fuel cell 1. The reformer 2 reforms reformate fuel, which is a mixture of methanol and water vapor, into reformate gas mainly composed of hydrogen. The reformer 2 is equipped with a heating portion 3 for heating reformate fuel, a reforming portion 4 and a carbon monoxide (CO) oxidation portion 5.

The heating portion 3 is designed to generate the vapor mixture of methanol and water by heating reformate fuel. The heating portion 3 is composed of a combustion portion 6 for generating heat for heating reformate fuel and a vaporizing portion 7 for vaporizing the reformate fuel using the heat generated by the combustion portion 6. The combustion portion 6 may be configured such that a burner causes a heating fuel to burn or such that a catalyst oxidizes the heating fuel. Referring to FIG. 2, a pump 8 for feeding methanol, which is an example of the heating fuel, is connected to the combustion portion 6 via an injector 9. Further, there is provided an air feed portion 10 (denoted in FIG. 2 as an air pump) for feeding air, which is an example of a combustion support gas. More preferably, the air feed portion 10 is composed of an air pump.

Further, a pump 11 serving as a reformate fuel feed portion, for feeding the liquid mixture of methanol and water, is connected to the vaporizing portion 7. The vaporizing portion 7 is coupled to the combustion portion 6 such that heat can be transmitted therebetween through a heat exchanger 12.

The reforming portion 4 is designed to generate gas mainly composed of hydrogen, mainly by means of reforming reactions of methanol. The reforming reactions are a water vapor reforming reaction and a so-called partial oxidation reaction, which are represented by the following formulas (ii) and (iii), respectively.

$$CH_3OH+H_2O \rightarrow 3H_2+\alpha CO_2-49.5 \text{ kJ/mol} \qquad (ii)$$

$$CH_3OH+1/2O_2 \rightarrow 2H_2+CO_2+189.6 \text{ kJ/mol} \qquad (iii)$$

In order to cause these reactions, a copper-based catalyst (not shown) with an activation temperature of, for example, 280–300° C., is employed. The vaporizing portion 7 is designed to supply the catalyst with the vapor mixture of methanol and water. An air pump 13, for feeding oxygen for the partial oxidation reaction, is connected to the catalyst.

As indicated by the above formula (ii) of the water vapor reforming reaction, in fact, an amount of carbon monoxide is inevitably generated and mixed into the reformate gas. Because carbon monoxide poisons a catalyst at an anode of the fuel cell 1, the CO oxidation portion 5 is provided so as to reduce the amount of carbon monoxide. The CO oxidation portion 5 is provided with a CO oxidation catalyst (not shown) and an air feed portion 14. The reformate gas generated in the reforming portion 4 is passed through the CO oxidation portion 5 so that the carbon monoxide contained in the reformate gas is oxidized by oxygen contained in the air.

On the other hand, the fuel cell 1 is composed of a multitude of unit cells that are interconnected in series to one another. For example, each unit cell has a construction wherein a high-molecular electrolyte film permeable to protons is interposed between an anode 15 and a cathode 16. The anode 15 and the cathode 16 are composed of a diffusion layer and a reaction layer. The reaction layer at the anode 15 has a porous structure wherein a catalyst such as platinum, platinum alloy or ruthenium is clamped by carbon. The anode 15 communicates with the reformer 2, to which reformate gas mainly containing hydrogen gas is fed. An air feed portion 17, such as a pump, is connected to the cathode 16 so as to feed oxygen, which is to react with hydrogen contained in the reformate gas.

External loads, such as a battery 18 and an inverter 19, are connected to the anode 15 and the cathode 16 in such a manner as to constitute a closed circuit. The closed circuit incorporates a current sensor 20. Furthermore, a motor 21 is connected to the inverter 19. For example, the motor 21 serves as a power source for driving a vehicle.

The ionization of hydrogen generated in the anode 15 and the oxidation reaction through an electrolytic film do not occur with respect to all of the hydrogen supplied to the fuel cell 1. The reaction efficiency is several tens of percent, and the exhaust gas discharged from the side of the anode 15 contains unreacted combustible gas, namely, hydrogen gas. In order to take advantage of the unreacted combustion gas effectively, a return pipe 22 for returning exhaust gas on the side of the anode 15 to the combustion portion 6 is disposed such that the fuel cell 1 communicates with the combustion portion 6. Further, the return pipe 22 extends across a flow rate regulating valve 23 for controlling a flow rate of gas flowing within the return pipe 22. The opening degree of the flow rate regulating valve 23 is electrically controlled. Furthermore, the return pipe 22 can discharge the gas flowing therein to the outside, such as indicated by arrow 24, instead of supplying the gas to the combustion portion 6.

Figure 3:
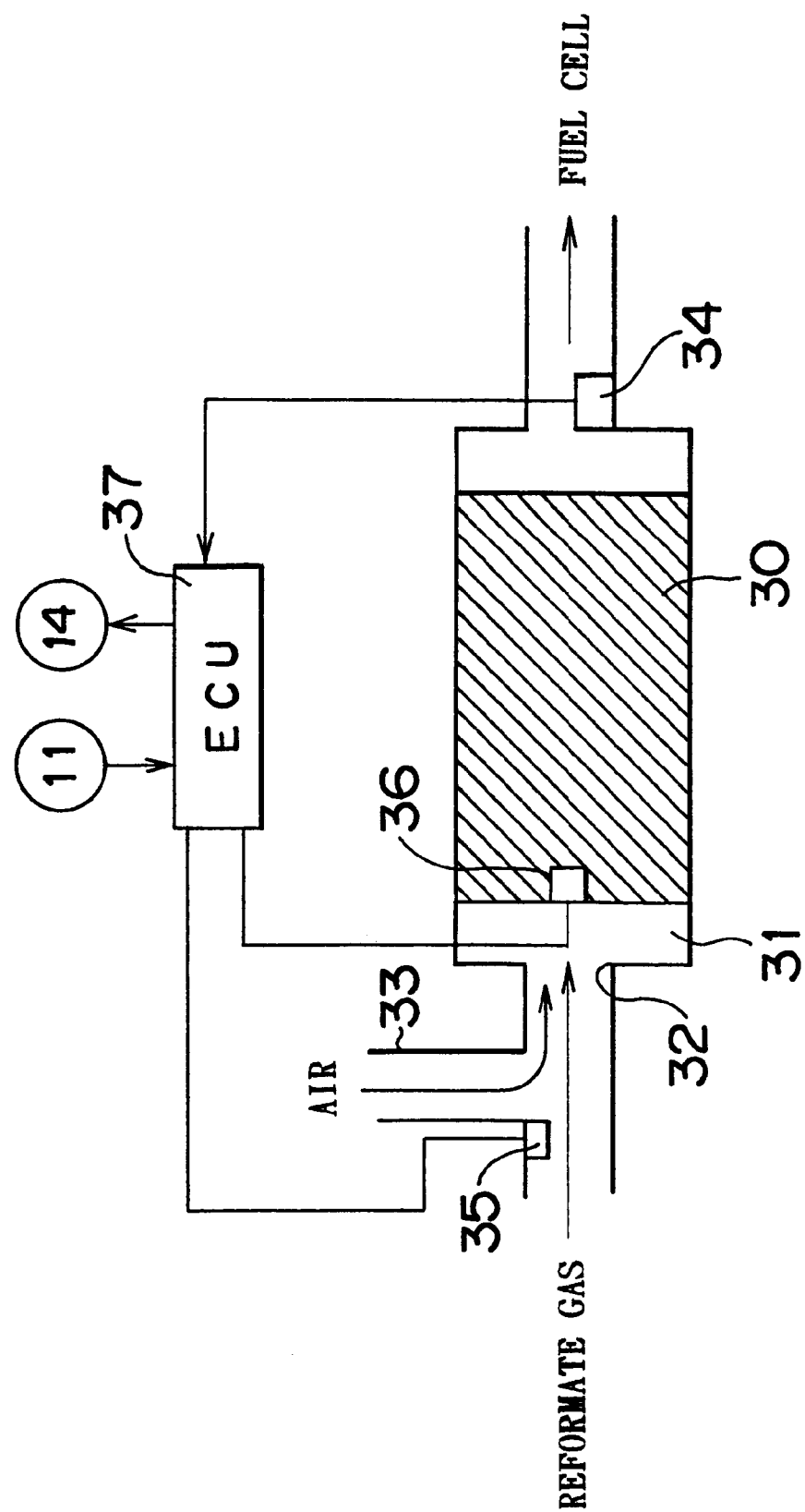
FIG. 3 schematically shows a carbon monoxide oxidation portion of the system.

Furthermore, the CO oxidation portion 5 will be described with reference to FIG. 3. A catalytic layer 30 composed of a predetermined catalyst (preferably, a catalyst for selectively oxidizing carbon monoxide) is provided in a chamber 31. The reforming portion 4 (see FIG. 1) is connected to a feed port 32 of the chamber 31. A CO oxidation air feed pipe 33 for supplying oxygen (air) for oxidizing carbon monoxide is connected to the feed port 32. The air feed portion 14 (see FIG. 1) mainly composed of an air pump, which is an oxygen supplying device of the present invention, is connected to the CO oxidation air feed pipe 33. Furthermore, a CO sensor 34 is provided on the side of an outlet of the chamber 31. The CO sensor 34 detects a concentration of carbon monoxide at the outlet of the chamber 31 and outputs a signal to a control unit 37. Also, a pressure sensor 35 is provided in the vicinity of the feed port 32. The pressure sensor detects a pressure at the feed port 32 and outputs a signal to the control unit 37. A temperature sensor 36, which detects a temperature and outputs a signal to the control unit 37, is provided on the side of the feed port 32 of the catalytic layer 30.

An electronic control unit (ECU) 37 is provided so as to control supply of CO oxidation air to the CO oxidation portion 5. The electronic control unit 37 is a so-called microcomputer, which mainly includes a central processing unit (CPU), storage devices (RAM, ROM) and an I/O interface. Control data such as an amount of reformate fuel that is supplied from the pump 11 to the vaporizing portion 7, an output signal from the CO sensor 34 (that is, a concentration of CO), an output signal from the pressure sensor 35 (that is, a pressure at the feed port), and an output signal from the temperature sensor 36 (that is, a temperature at the CO oxidation portion 5) are inputted to the electronic control unit 37. Calculation is then made according to a program in which the inputted data are preliminarily stored, and the result is outputted to the air feed portion 14 as a command signal.

The basic operation of the aforementioned reformer 2 will now be described. A liquid feed pump 11 feeds the liquid mixture of methanol and water to the vaporizing portion 7. The liquid mixture is a reformate fuel. On the other hand, combustion methanol is sprayed from the injector 9 into the combustion portion 6. Alternatively, exhaust gas containing unused hydrogen gas is supplied from the return pipe 22 to the combustion portion 6 simultaneously with or in place of the spraying of combustion methanol. Further, the air pump feeds combustion support gas, such as air, to the combustion chamber 21. The combustion methanol and/or the combustion support gas and the heating fuel composed of unused hydrogen gas undergo an oxidation reaction (that is, burn) in the oxidation catalyst and generate heat. This heat vaporizes the liquid mixture, so that the vapor mixture of methanol and water is generated.

The vapor mixture generated in the vaporizing portion 7 is delivered to the reforming portion 4. The copper-based catalyst provided in the reforming portion 4 causes a reforming reaction of methanol with water. Consequently, reformate gas mainly composed of hydrogen gas and carbon dioxide gas is generated. Simultaneously, there is caused a partial oxidation reaction of the air fed from the air pump 13 to the reforming portion 4 with methanol. The partial oxidation reaction is represented by the above formula (iii). As a result of the partial oxidation reaction, hydrogen gas and carbon dioxide gas are generated.

The water vapor reforming reaction of methanol is an endothermic reaction, whereas the partial oxidation reaction of methanol is an exothermic reaction. Hence, these reactions are controlled such that the endothermic value becomes equal to the exothermic value. Thereby, the heat budget in the reforming portion 4 is balanced so that the temperature of the reforming portion 4 is kept substantially constant. Because heat neither enters nor leaves the reforming portion 4, the heat generated in the combustion portion 6 is exclusively used to heat and vaporize reformate fuel.

In principle, the gas generated in the reforming portion 4 is nothing but hydrogen gas and carbon dioxide gas. In fact, however, a small amount of carbon monoxide (about 1%) is generated. While reformate gas passes through the CO oxidation portion 5, most of the carbon monoxide reacts with oxygen contained in the air fed from the air feed portion 14 to become carbon dioxide. The reformate gas with a high concentration of hydrogen is delivered to the anode 15 of the fuel cell 1, whereby hydrogen ions and electrons are generated in the reaction layer thereof. The hydrogen ions permeate the electrolytic film, react with oxygen on the side of the cathode 16 and generate water. The electrons generate power through the external loads.

Figure 1:
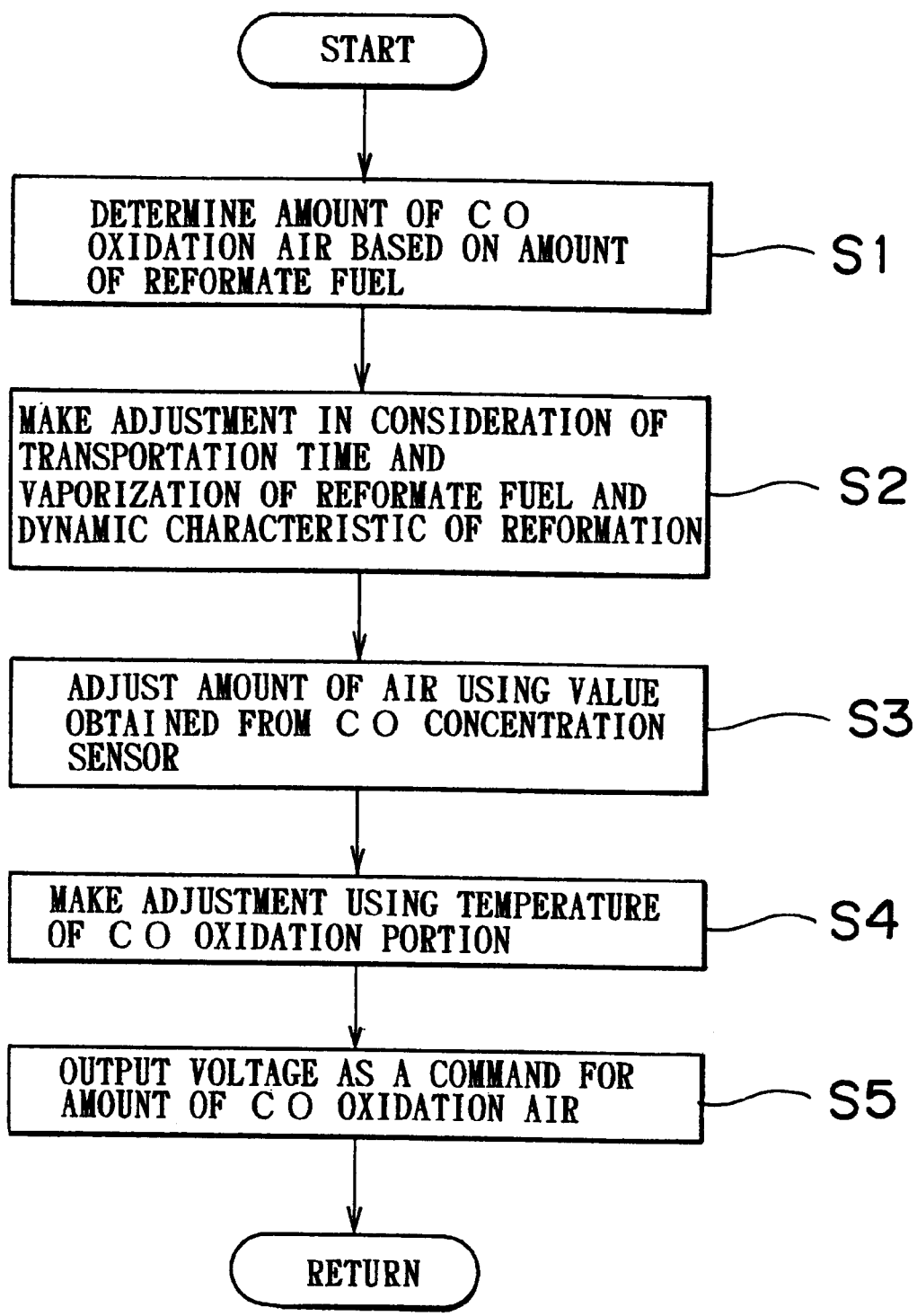
FIG. 1 is a flowchart showing an exemplary embodiment of control performed by a control device according to a first embodiment of the present invention.

In order to cause the entire amount of carbon monoxide contained in the reformate gas to burn at the CO oxidation portion 5, the amount of oxygen (more specifically, the amount of air) supplied thereto is controlled as follows. FIG. 1 is a flowchart illustrating an example of such control. The amount of CO oxidation air is calculated based on an amount of reformate fuel (step 1). The amount of reformate fuel Fk (mol/s) corresponds to an amount of hydrogen required in the fuel cell 1. Therefore, the amount of reformate fuel is determined based on a load applied to the fuel cell 1.

$\alpha$ mole of carbon monoxide is generated through reformation of 1 mole of methanol. The generation amount of carbon monoxide assumes a predetermined value depending on the characteristic of the reformate catalyst and reformate conditions, and therefore can be determined through experiments. Further, 1/2 mole of oxygen is required to oxidize 1 mole of carbon monoxide. Further, the efficiency in the oxidation reaction of carbon monoxide is not always 100%. Therefore, in order to oxidize the entire amount of carbon monoxide, it is necessary to supply oxygen with a predetermined excess rate. For example, this excess rate assumes a value of about "5" and can be determined through experiments. Accordingly, the amount $Q$ col (l/s) of oxygen required to sufficiently oxidize and remove the carbon monoxide contained in the reformate gas is calculated based on the following formula.

$$Q\ col(l/s)=\alpha \times Fk(mol/s)\times 1/2\times 22.4(l/mol)\times 100/21\times 298/278\times excess\ rate$$

In this formula, "100/21" represents a conversion factor for converting the required amount of oxygen into the amount of air, and "298/273" represents a volume adjustment factor for a room temperature of 25° C.

During a lapse of time between starting with the supply of reformate fuel and ending with the generation of reformate gas through a reforming reaction, a temporal delay is caused due to a length of time for transportation of the reformate fuel and a dynamic characteristic in the vaporizing portion 7 and the reforming portion 4. Thus, adjustment is made based on the temporal delay in step 2. Provided that the length of the temporal delay is t0, the adjustment is made according to the following formula.

$$Q\ co2=Q\ col(t-t0)$$

That is, the amount of air that is calculated before the lapse of the temporal delay t0 is adopted as an amount of CO oxidation air at the present time. Further, if it is assumed that the dynamic characteristic of the vaporizing portion 7 and the reforming portion 4 is a primary delay, adjustment is made according to the following formula.

$$Q\ co3(l/s)=Q\ co3old \times \tau/(DT+\tau)+Q\ co2\times DT/(DT+\tau)$$

In this formula, DT represents a control cycle, $\tau$ represents an amount indicative of a degree of primary delay, and Q co3old represents a hysteresis of the value of Q co3 during a preceding control cycle.

The aforementioned amount of CO oxidation air is calculated based on an amount of reformate fuel. However, the proportion of carbon monoxide generated in the reforming portion 4 and the oxidation rate of carbon monoxide in the CO oxidation portion 5 do not always assume precisely constant values, but instead fluctuate slightly. Thus, adjustment is made in consideration of such fluctuation at step 3. That is, the amount of supply of oxygen is adjusted such that the concentration D co (ppm) of carbon monoxide detected by the CO concentration sensor 34 becomes a target concentration D coref (ppm) of the carbon monoxide contained in the reformate fuel supplied to the fuel cell 1. One such example is represented by the following formula.

$$Q\ co4(l/s)=Q\ co3+Kp\times(D\ coref-D\ co)+Ki\times\Sigma(D\ coref-D\ co)$$

In this formula, Kp and Ki represent control parameters, and $\Sigma$ (D coref−D co) represent a cumulative value of differences between the target concentration D coref and the detected concentration D co. That is, in the case where the detected concentration of carbon monoxide is high, the amount of CO oxidation air is increased. Conversely, in the case where the detected concentration of carbon monoxide is low, the amount of CO oxidation air is reduced. In this manner, the amount of CO oxidation air is controlled such that the detected concentration of carbon monoxide becomes a target concentration. Further, the target concentration D coref of carbon monoxide represents a permissible value of electric power in the fuel cell 1, which permissible value is used as a criterion for poisoning of the fuel cell 1. The target concentration D coref of carbon monoxide is calculated through experiments from operating conditions of the fuel cell 1, such as a temperature and a pressure.

As is known, the oxidation reaction of carbon monoxide is an exothermic reaction. Therefore, if a large amount of carbon monoxide is continuously oxidized in the CO oxidation portion 5, the catalytic layer 30 rises in temperature excessively, so that the catalytic layer 30 may deteriorate in quality. Thus, in order to prevent deterioration of the catalyst, the amount of CO oxidation air is adjusted based on a temperature of the CO oxidation portion 5 at step S4. This adjustment is made by multiplying the already-calculated amount of CO oxidation air by a coefficient, as can be seen from the following formula.

$$Q\ co5=Kdec\times Q\ co4$$

Figure 4:
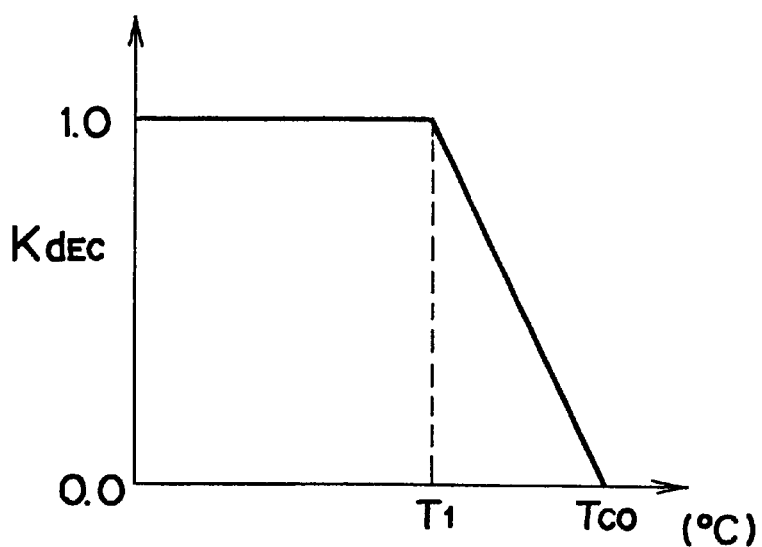
FIG. 4 shows an example of a map for determining a coefficient for adjusting an amount of supply of carbon monoxide based on a temperature.

In this formula, as shown in FIG. 4, the adjustment factor Kdec is determined as a function of a temperature Tco (° C.) of the CO oxidation portion 5. After the temperature Tco has exceeded a threshold value Ti for deterioration of the catalyst resulting from an abnormally high temperature, the adjustment factor Kdec becomes small. That is, if the catalyst reaches a relatively high temperature, the amount of supply of oxygen is reduced. Consequently, the oxidation of carbon monoxide is inhibited, and the catalyst is prevented from rising in temperature.

If the amount of a reforming reaction in the reforming portion 4 increases, the amount of reformate gas supplied from the reforming portion 4 to the CO oxidation portion 5 increases. Therefore, the pressure at the feed port 32 of the CO oxidation portion 5 becomes high. The oxygen for oxidizing the carbon monoxide contained in the reformate gas is supplied to the feed port 32 as air. Thus, the amount of supply of oxygen affects a pressure at the feed port 32. That is, if the pressure at the feed port 32 is high, it is necessary to increase a feed pressure of air. Conversely, if the pressure at the feed port 32 is low, the feed pressure of air can be lowered. Such adjustment is made in step S5.

Figure 5:
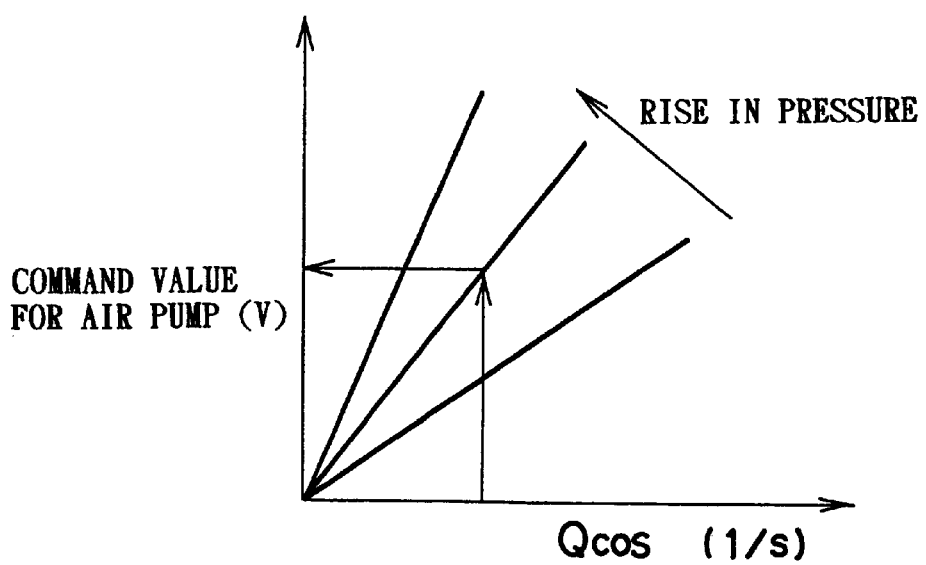
FIG. 5 shows an example of a map showing a relationship between the amount of carbon monoxide oxidation air and the command value for an air pump, using a pressure as a parameter.

In other words, there is a certain relationship established between a command value for the air pump constituting the air feed portion 14 and a discharge amount of air, depending on the capacity of the air pump. In general, the command value changes in proportion to the discharge amount of air. Conversely, if the pressure at a location to which air is supplied is high, it is necessary to supply air at a correspondingly high pressure. Therefore, it is necessary to increase an output of the air pump, that is, a command value for the air pump. FIG. 5 is a diagram showing a relationship between the discharge amount of the air pump and the command value for the air pump. The higher the pressure at the feed port 32, that is, the pressure at a location to which air is supplied, becomes, the higher the command value (more specifically, for example, voltage) for the air pump needs to be set. In step S5, the command value is set in accordance with the amount of supply of oxygen, which amount is calculated based on a relationship shown in FIG. 5 when the detected pressure is applied to the feed port 32.

The pressure at the feed port 32 is correlated with the pressure at the outlet of the reformer 2. Therefore, instead of directly detecting a pressure at the feed port 32 as described above, the pressure at the feed port 32 may be estimated from a pressure at the outlet of the reformer 2. Then, the command value for the air feed portion 14 may be adjusted based on the estimated pressure.

As described above, according to the control device of the present invention, the amount of oxygen contributing to oxidation of carbon monoxide is determined based on an amount of reformate fuel. Therefore, the entire amount of carbon monoxide contained in the reformate gas can be oxidized and removed from the reformate gas. As a result, it is possible to supply the fuel cell 1 with high-quality reformate gas. In particular, according to the above-described example, the amount of air is adjusted based on a temporal delay in transportation and reaction of reformate fuel. Therefore, in the CO oxidation portion 5, the amount of carbon monoxide matches the amount of oxygen. As a result, it is possible to effectively oxidize carbon monoxide and thus reduce a concentration thereof.

Further, the amount of air is adjusted based on a difference between the current and target concentrations of carbon monoxide. Therefore, the concentration of the carbon monoxide contained in the reformate gas can be made to coincide with its target value or to approach the target value more precisely. Further, the amount of air is adjusted based on a temperature of the CO oxidation portion. Therefore, it is possible to prevent the CO oxidation portion 5 from reaching an abnormally high temperature, and to avoid any resultant impairment or deterioration thereof. Furthermore, the command value for the air supply can be adjusted based on a pressure of the air supplied to the CO oxidation portion 5. Consequently, the calculated amount of oxygen can be securely supplied to the CO oxidation portion 5, whereby the concentration of the carbon monoxide contained in the reformate gas can be reduced effectively.

In the aforementioned example, the present invention is applied to a device designed for a reformer for supplying the fuel cell 1 with fuel gas. However, the present invention is not limited to the specific examples mentioned above. It is possible to select an apparatus for supplying reformate gas as the case requires. Although methanol is used as a reformate fuel in the aforementioned embodiment, the reformer of the present invention may also be designed to reform other hydrocarbons. In principle, according to the present invention, the pressure at the location to which oxygen for oxidizing carbon monoxide is supplied may be detected or estimated based on a state quantity relating thereto. Thus, the present invention is not limited to the above-mentioned construction. Still further, in the present invention, the oxygen for reducing a concentration of carbon monoxide may also be supplied in the form of pure oxygen instead of air. Still further, in the aforementioned concrete example, adjustments are made respectively in the steps S2 to S5. However, the present invention does not require all of these adjustments, and it is possible to selectively carry out one or more of these adjustments as desired. Accordingly, the values handled in each of the adjustment processes are not limited to those shown in the aforementioned example. The point is that the values obtained before each of the adjustment processes can be adjusted.

As described herein, a first aspect of the present invention focuses attention to the fact that the amount of fuel contributing to the reforming reaction is correlated with the amount of carbon monoxide contained in the reformate fuel. That is, the amount of oxygen supplied to oxidize carbon monoxide is changed in accordance with a change in amount of carbon monoxide. Therefore, the amount of oxygen is set to an amount suited for the amount of carbon monoxide. As a result, it is possible to oxidize the entire amount of carbon monoxide contained in the reformate gas and reduce the concentration thereof.

A second embodiment of the present invention will be described with reference to the drawings.

Figure 6:
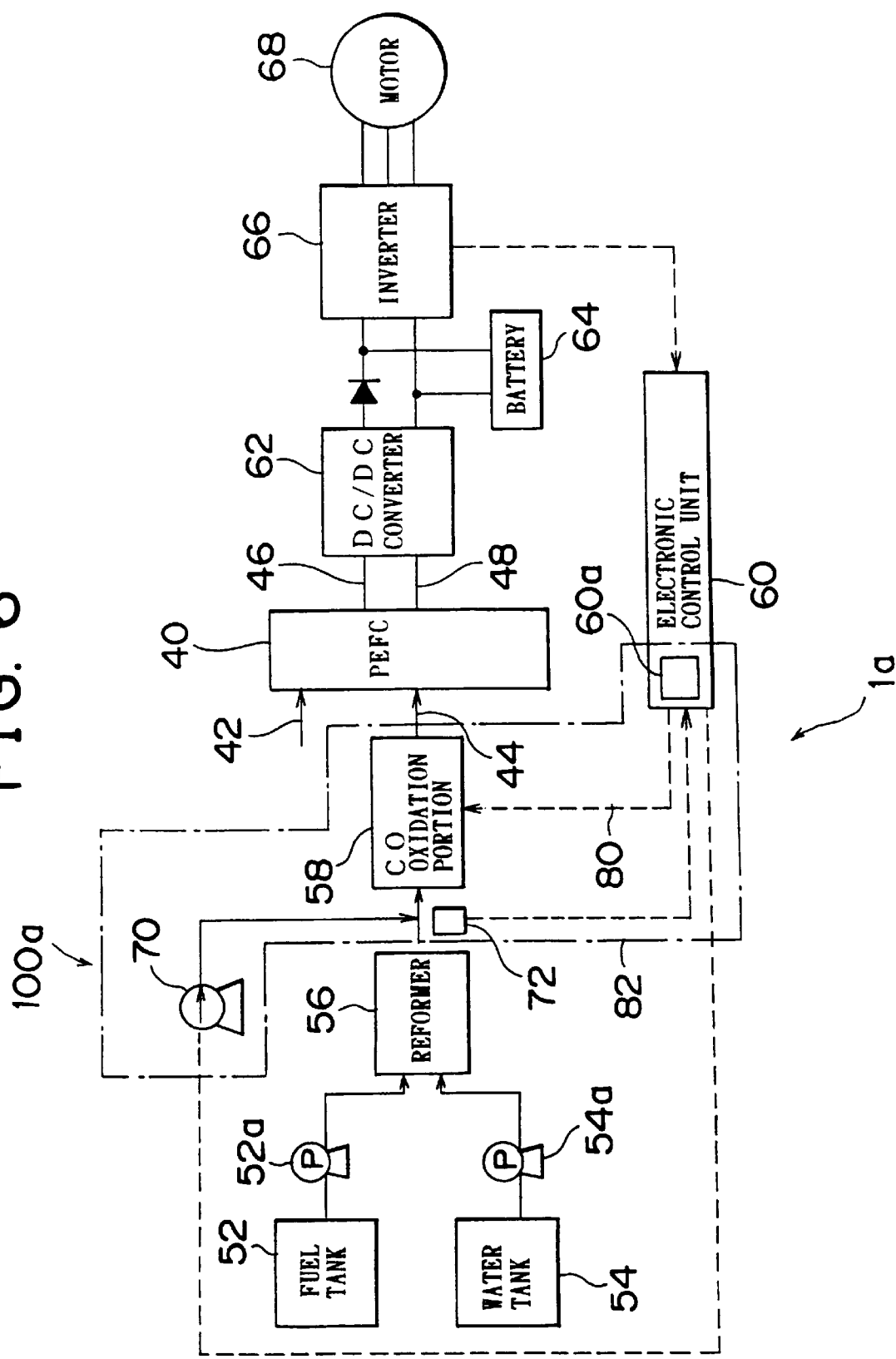
FIG. 6 shows the construction of a fuel cell system 1a according to a second embodiment of the present invention.

FIG. 6 shows the construction of a fuel cell system 1a according to a second embodiment of the present invention. The fuel cell system 1a is provided with a polymer electrolyte fuel cell (hereinafter, referred to as a PEFC) 40.

Oxidizing gas such as air is supplied to the PEFC 40 through an oxygen gas feed pipe line 42. Also, reformate gas (hydrogen gas), which has been obtained by subjecting fuel gas to water vapor reformation, is supplied to the PEFC 40 through a hydrogen gas feed pipe line 44. The hydrogen gas feed pipe line 44 is provided with a carbon monoxide oxidation portion (CO oxidation portion) 58 for reducing a concentration of carbon monoxide (CO) contained in the reformate gas and a reformer 56 for subjecting fuel gas to water vapor reformation. For example, methanol is used as the fuel gas.

The PEFC 40 has a construction wherein a polymer electrolyte film is interposed between an anode and a cathode. While air is supplied to the anode, hydrogen gas is supplied to the cathode. As a result, the electrode reactions shown below occur in the anode and cathode, respectively.

anode: $2H_2 \rightarrow 4H^+ + 4e^-$ cathode: $4H^+ + 4e^- + O_2 \rightarrow 2H_2O$ The PEFC 40 supplies electric power to a DC/DC converter 62 through lines 46 and 48, by means of the electromotive force obtained by the aforementioned electrode reactions.

The DC/DC converter 62 converts a voltage obtained from the PEFC 40 into a desired voltage, which is supplied to a motor 68 through an inverter 66. Consequently, the motor 68 is driven. A battery 64 for supplying auxiliary electric power to the motor 68 is connected between the DC/DC converter 62 and the inverter 66. The battery 64 functions as an auxiliary battery.

Fuel gas is fed to the reformer 56 from a fuel tank 52 through a pressure pump 52a. Also, water is supplied to the reformer 56 from a water tank 54 through a pressure pump 54a. The reformer 56 causes a reforming reaction of fuel gas with water to proceed at a predetermined temperature, whereby hydrogen gas mixed with water vapor is produced. The hydrogen gas produced by the reformer 56 is delivered to the CO oxidation portion 58.

The CO oxidation portion 58 selectively oxidizes carbon monoxide contained in the reformate gas emitted from the reformer 56 and thereby reduces a concentration of the carbon monoxide. The oxidation reaction of carbon monoxide in the CO oxidation portion 58 is as shown below.

$$CO + 1/2 O_2 \rightarrow CO_2$$

The aforementioned oxidation reaction makes it possible to make a concentration of the carbon monoxide contained in the reformate gas equal to or lower than 100 ppm. The reformate gas with a concentration of carbon monoxide reduced by the CO oxidation portion 58 is supplied to the PEFC 40.

An air pump 70 supplies a predetermined amount of oxygen to the CO oxidation portion 58. The amount of oxygen supplied to the CO oxidation portion 58 is determined in accordance with a required output to the PEFC 40.

Figure 7A:
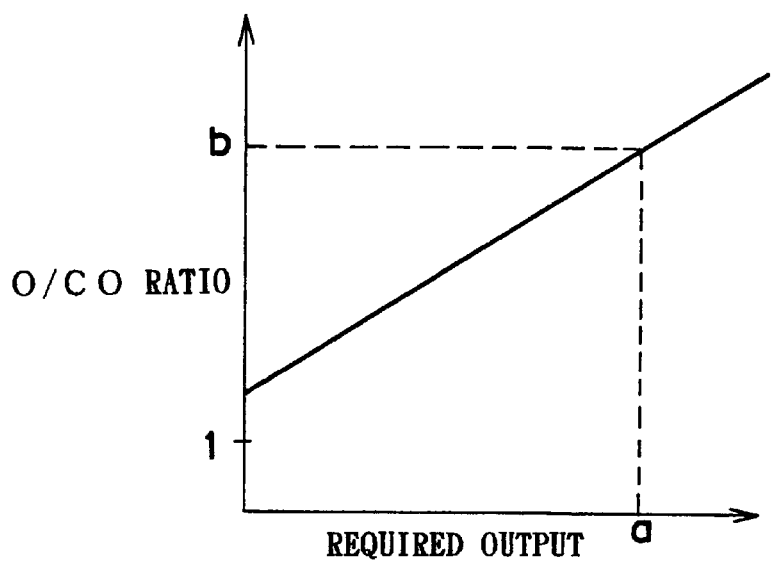
FIG. 7A shows a relationship between the required output to a PEFC 10 and the O/CO ratio at a carbon monoxide oxidation portion 58.

FIG. 7A shows a relationship between the required output to the PEFC 40 (that is, the amount of reformate gas supplied to the CO oxidation portion 58) and the ratio between concentrations of oxygen and carbon monoxide at the CO oxidation portion 58 (the O/CO ratio). For example, the relationship shown in FIG. 7A can be stored in the ROM (not shown) of the electric control unit 60 in the form of a map.

The electronic control unit 60 receives from the inverter 66 a required output to the PEFC 40. The electronic control unit 60 controls an O/CO ratio at the CO oxidation portion 58 in accordance with a required output from the inverter 66. For example, as shown in FIG. 7A, in the case where the required output assumes a value of a, the O/CO ratio is controlled so as to assume a value of b, which corresponds to the value of a.

The control of the O/CO ratio is achieved by detecting a concentration of CO at the CO oxidation portion 58 and adjusting an amount of oxygen supplied to the CO oxidation portion 58 based on the detected concentration of CO. A CO sensor 72 detects a concentration of carbon monoxide. For example, the CO sensor 72 is provided in the vicinity of an outlet of the reformer 56. An air pump 70 adjusts an amount of oxygen supplied to the CO oxidation portion 58. The electronic control unit 60 controls the air pump 70.

In this manner, the electronic control unit 60 controls an amount of oxygen supplied to the CO oxidation portion 58 in accordance with a required output to the PEFC 40 (that is, an amount of reformate gas supplied to the CO oxidation portion 58). Thereby, it is possible to continuously control an amount of oxygen supplied to the CO oxidation portion 58. As a result, the oxidation reaction of CO at the CO oxidation portion 58 can be continuously controlled.

Further, in the fuel cell system 1a, the amount of oxygen supplied to the CO oxidation portion 58 is controlled such that the O/CO ratio at the CO oxidation portion 58 increases with increases in required output to the PEFC 40. The O/CO ratio at the CO oxidation portion 58 is set so as to be always greater than 1 regardless of a required output to the PEFC 40. Consequently, even under the condition that the CO oxidation portion 58 is maintained at a constant temperature, the oxidation reaction of CO proceeds with increases in required output to the PEFC 40.

The O/CO ratio is always greater than 1, and the degree of excess of oxygen becomes great in accordance with a required output. Therefore, even if the required output, that is, the amount of reformate gas, has increased, the oxidation of CO can be sufficiently carried out under a constant temperature. In this manner, it is possible to cause an oxidation reaction of CO corresponding to a required output to the PEFC 40, while maintaining the CO oxidation portion 58 at a constant temperature.

Figure 7B:
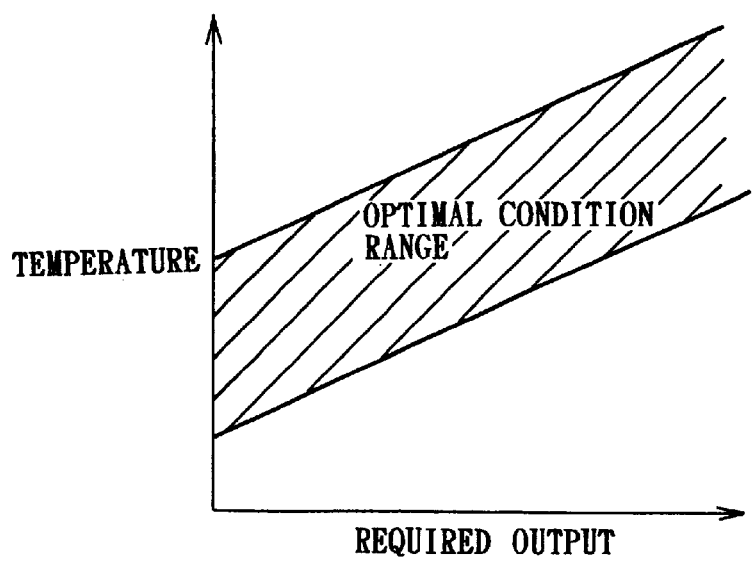
FIG. 7B shows an optimal condition range for the temperature of the carbon monoxide oxidation portion 58 according to a conventional method.
Figure 7C:
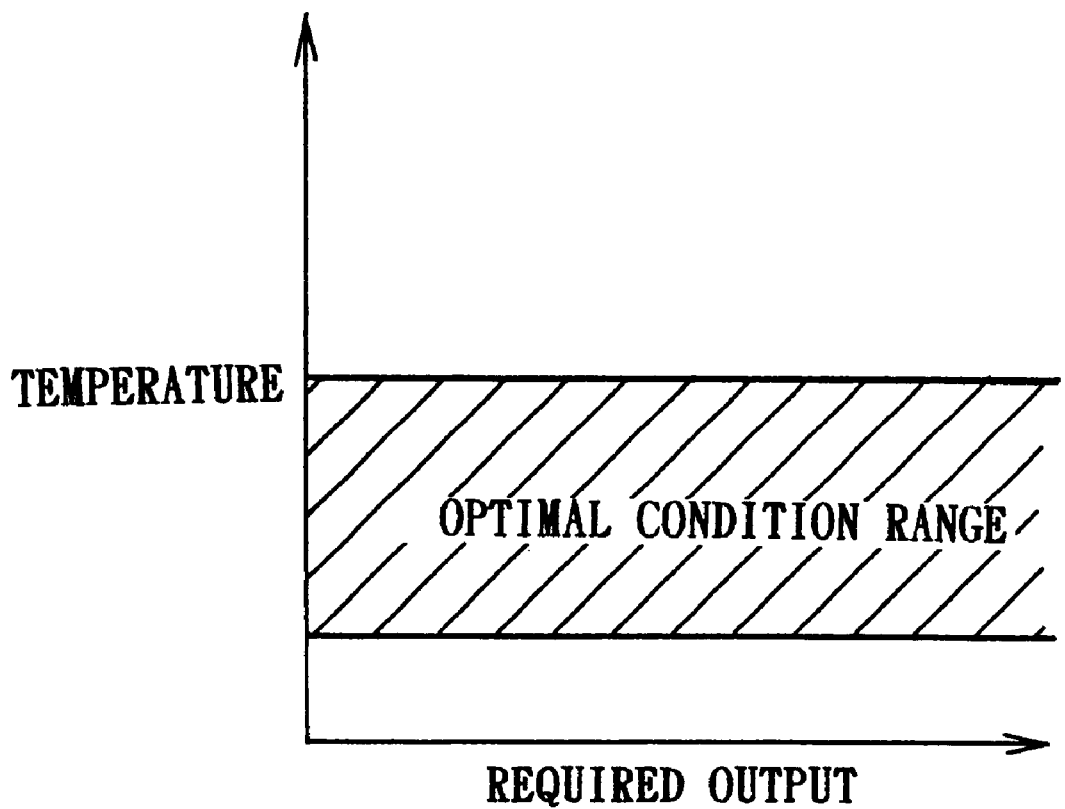
FIG. 7C shows an optimal condition range for the temperature of the carbon monoxide oxidation portion 58 according to a method of the present invention.

FIG. 7B shows an optimal condition range for a temperature of the CO oxidation portion 58 according to a conventional method. FIG. 7C shows an optimal condition range for a temperature of the CO oxidation portion 58 according to a method of the present invention. Referring to FIGS. 7B and 7C, the hatched areas represent the optimal condition ranges.

It is far easier to control a temperature of the CO oxidation portion 58 such that the temperature comes into the optimal condition range shown in FIG. 7C than to control a temperature of the CO oxidation portion 58 such that the temperature comes into the optimal condition range shown in FIG. 7B. The temperature of the CO oxidation portion 58 is controlled to be kept constant regardless of a required output to the PEFC 40. This is easily achieved, for example, by providing a cooling system through which coolant is caused to circulate so as to prevent the CO oxidation portion 58 from rising in temperature due to an oxidation reaction (exothermic reaction) of CO within the CO oxidation portion 58. This control is indicated by an arrow 80 extending from the electronic control unit 60 to the CO oxidation portion 58 shown in FIG. 6. In this manner, in comparison with the case where the temperature of the CO oxidation portion 58 is variably controlled in accordance with a required output to the PEFC 40, it is more advantageous to perform control so as to keep a temperature of the CO oxidation portion 58 constant. That is, it is possible to simplify a mechanism for controlling a temperature of the CO oxidation portion 58.

In the construction shown in FIG. 6, the area surrounded by an alternate long and short dash line 82 can also be considered as a carbon monoxide reducing device 100a. That is, the carbon monoxide reducing device 100a includes the CO oxidation portion 58, an oxygen supplying device 70 and a control portion 60a. The CO oxidation portion 58 produces carbon dioxide by selectively oxidizing carbon monoxide contained in the reformate gas that is obtained through reformation of fuel gas by means of a reforming catalyst. The oxygen supplying device 70 supplies the CO oxidation portion 58 with oxygen together with reformate gas. The control portion 60a controls a status of a supply oxygen to the CO oxidation portion 58 in accordance with an amount of reformate gas supplied thereto. The electronic control unit 60 incorporates the control portion 60a. By controlling the status of the supply oxygen to the CO oxidation portion 58 in accordance with an amount of reformate gas supplied thereto, it is possible to simplify temperature control of the CO oxidation portion 58, which determines response performance of an oxidation reaction of CO, and to continuously control the oxidation reaction.

In this embodiment, the status of the supply oxygen to the CO oxidation portion 58 is determined based on an O/CO ratio inside the CO oxidation portion 58. In this case, the amount of oxygen supplied to the CO oxidation portion 58 is controlled, whereby the O/CO ratio inside the CO oxidation portion 58 can easily be controlled. As a result, the amount of oxygen supplied to the CO oxidation portion 58 can easily be controlled.

A third embodiment of the present invention will now be described with reference to the drawings.

Figure 8:
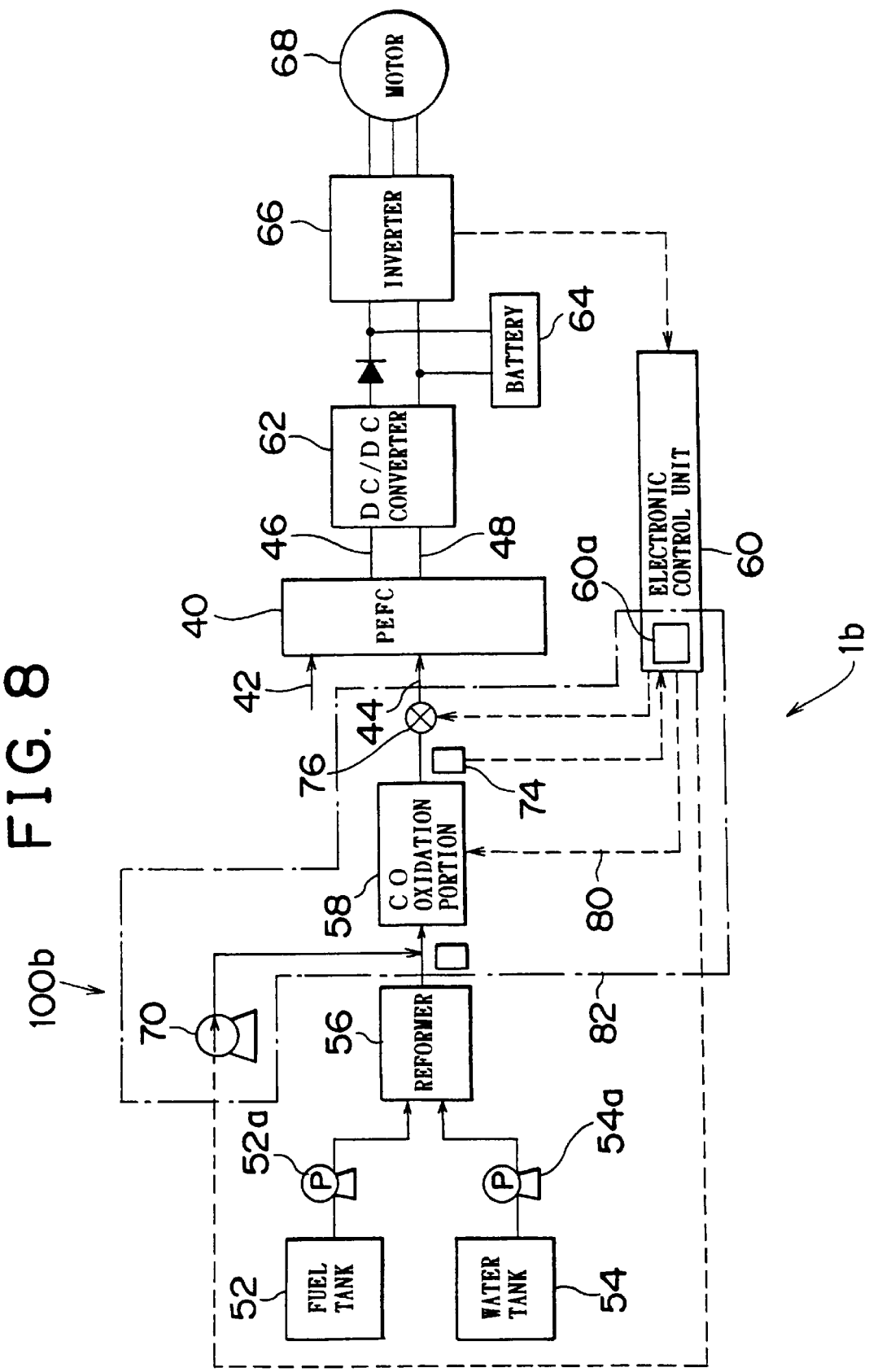
FIG. 8 shows the construction of a fuel cell system 1b according to a third embodiment of the present invention.

FIG. 8 shows the construction of a fuel cell system 1b according to a third embodiment of the present invention. The fuel cell system 1b includes a pressure sensor 74 for detecting a pressure inside the CO oxidation portion 58 and a pressure regulating valve 76 for regulating a pressure inside the CO oxidation portion 58.

The pressure sensor 74 is provided in the vicinity of the outlet of the CO oxidation portion 58. Alternatively, the pressure sensor 74 may be provided inside the CO oxidation portion 58. The electronic control unit 60 controls an opening degree of the pressure regulating valve 76.

The air pump 70 supplies the CO oxidation portion 58 with a predetermined amount of oxygen. The amount of oxygen supplied to the CO oxidation portion 58 is determined based on a required output to the PEFC 40.

Figure 9A:
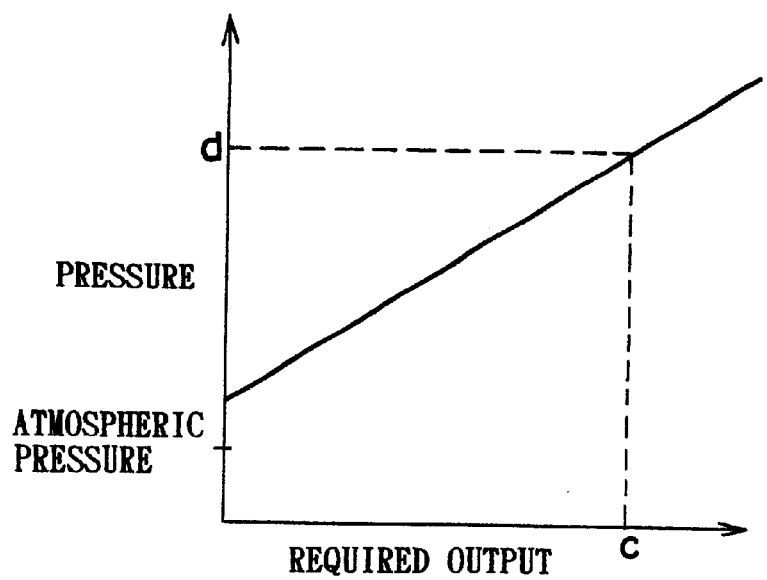
FIG. 9A shows a relationship between the required output to the PEFC 10 and the pressure in the carbon monoxide oxidation portion 58.

FIG. 9A shows a relationship between the required output to the PEFC 40 (that is, the amount of reformate gas supplied to the CO oxidation portion 58) and the pressure inside the CO oxidation portion 58. For example, the relationship shown in FIG. 9A can be stored in the ROM (not shown) of the electric control unit 60 in the form of a map.

The electronic control unit 60 receives from the inverter 66 a required output to the PEFC 40. The electronic control unit 60 controls a pressure inside the CO oxidation portion 58 in accordance with a required output from the inverter 66. For example, as shown in FIG. 9A, in the case where the required output assumes a value of c, the pressure inside the CO oxidation portion 58 is controlled so as to assume a value of d, which corresponds to the value of c. It is a premise herein that the O/CO ratio at the CO oxidation portion 58 is controlled to be kept constant.

The control of the pressure inside the CO oxidation portion 58 is achieved by detecting a pressure inside the CO oxidation portion 58 and regulating an opening degree of the pressure regulating valve 76 based on the detected pressure. Further, in order to perform control for keeping the O/CO ratio constant, the amount of oxygen supplied to the CO oxidation portion 58 is regulated. Such control of the O/CO ratio is performed in the same manner as in the second embodiment described above.

In the fuel cell system 1b, the opening degree of the pressure regulating valve 76 is controlled such that the pressure inside the CO oxidation portion 58 increases with increases in required pressure to the PEFC 40. The pressure inside the CO oxidation portion 58 is set so as to be always higher than an atmospheric pressure regardless of a required output to the PEFC 40. If the pressure inside the CO oxidation portion 58 increases, the length of time in which CO is in contact with the catalyst increases, whereby the oxidation reaction of CO proceeds. Consequently, even under the condition that the CO oxidation portion 58 is maintained at a constant temperature, the oxidation reaction of CO proceeds with increases in required output to the PEFC 40. In this manner, it is possible to cause an oxidation reaction of CO corresponding to a required output to the PEFC 40, while maintaining the CO oxidation portion 58 at a constant temperature.

Figure 9B:
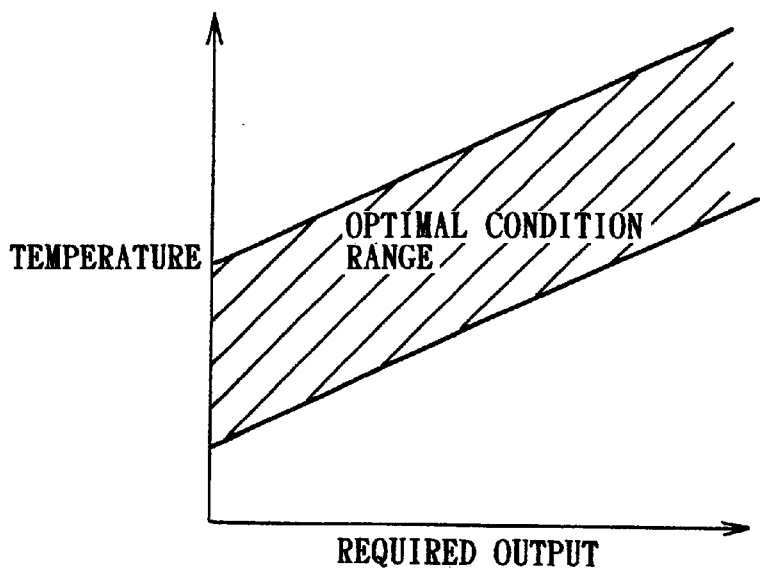
FIG. 9B shows an optimal condition range for the temperature of the carbon monoxide oxidation portion 58 according to a conventional method.
Figure 9C:
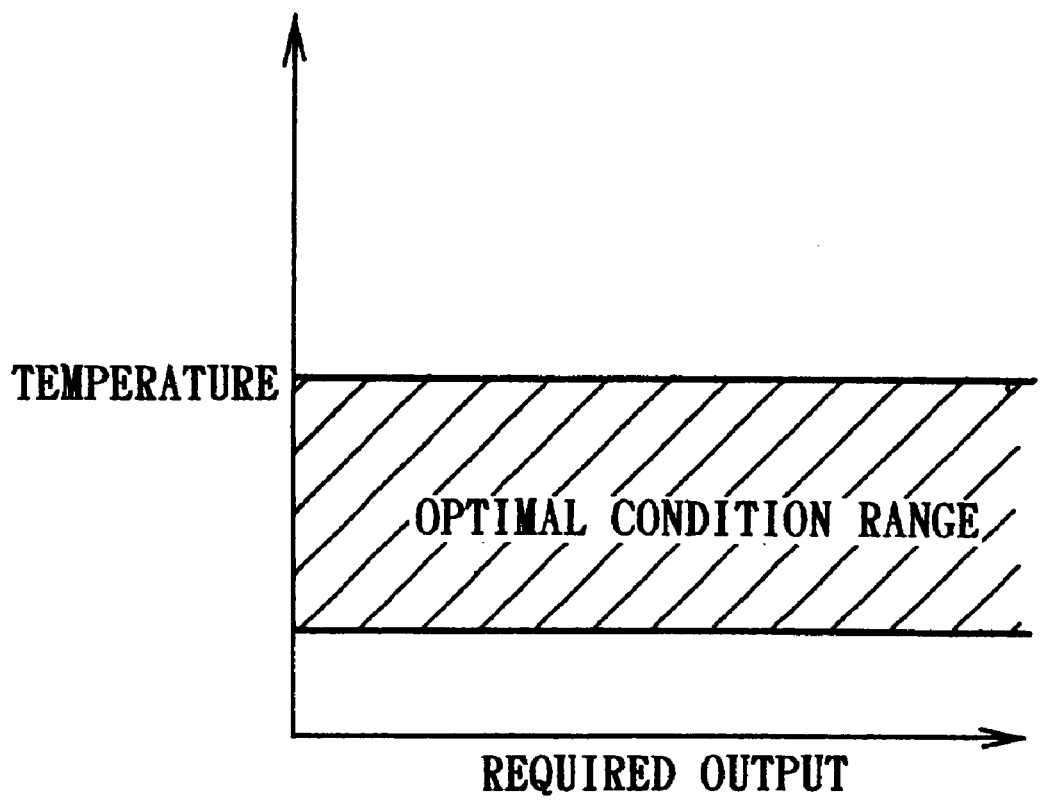
FIG. 9C shows an optimal condition range for the temperature of the carbon monoxide oxidation portion 58 according to a method of the present invention.

FIG. 9B shows an optimal condition range for a temperature of the CO oxidation portion 58 according to a conventional method. FIG. 9C shows an optimal condition range for a temperature of the CO oxidation portion 58 according to a method of the present invention. Referring to FIGS. 9B and 9C, the hatched areas represent the optimal condition ranges.

It is far easier to control a temperature of the CO oxidation portion 58 such that the temperature comes into the optimal condition range shown in FIG. 9C than to control a temperature of the CO oxidation portion 58 such that the temperature comes into the optimal condition range shown in FIG. 9B. The temperature of the CO oxidation portion 58 is controlled to be kept constant regardless of a required output to the PEFC 40. This is easily achieved, for example, by providing a cooling system through which coolant is caused to circulate so as to prevent the CO oxidation portion 58 from rising in temperature due to an oxidation reaction (exothermic reaction) of CO within the CO oxidation portion 58. This control is indicated by an arrow 80 extending from the electronic control unit 60 to the CO oxidation portion 58 shown in FIG. 8. In this manner, in comparison with the case where the temperature of the CO oxidation portion 58 is variably controlled in accordance with a required output to the PEFC 40, it is more advantageous to perform control so as to keep a temperature of the CO oxidation portion 58 constant. That is, it is possible to simplify a mechanism for controlling a temperature of the CO oxidation portion 58.

Further, the control of the O/CO ratio may be combined with the control of the pressure inside the CO oxidation portion 58.

The control of the O/CO ratio is advantageous in that the amount of supply of oxygen can be changed quickly enough to ensure a high response performance. On the other hand, the control of the O/CO ratio is disadvantageous in that the oxygen supplied to the CO oxidation portion 58 reacts with the hydrogen therein, produces water and thereby causes a deterioration in efficiency of the oxidation reaction of carbon monoxide.

The control of the pressure inside the CO oxidation portion 58 is advantageous in that the O/CO ratio is kept constant and thereby causes an enhancement in efficiency in the oxidation reaction of carbon monoxide. On the other hand, the control of the pressure inside the CO oxidation portion 58 is disadvantageous in that the regulation of pressure is accompanied by a certain time lag, which causes a low response performance.

In the case where the required output to the PEFC 40 is low, a higher priority is given to the response performance of an oxidation reaction of carbon monoxide than to the efficiency thereof. Conversely, in the case where the required output to the PEFC 40 is high, a higher priority is given to the efficiency of an oxidation reaction of carbon monoxide than to the response performance thereof. In this manner, it is possible to realize a fuel cell system that is optimized for a required output.

In a preferred embodiment, if the required output to the PEFC 40 is low, the amount of oxygen supplied to the CO oxidation portion 58 is controlled such that the O/CO ratio increases with increases in required output to the PEFC 40. If the required output to the PEFC 40 is high, the pressure inside the CO oxidation portion 58 is controlled such that the pressure increases with increases in required output to the PEFC 40. In this manner, it is possible to realize an optimized fuel cell system that exhibits a high response performance when the required output to the PEFC 40 is low and that accomplishes a high reaction efficiency when the required output to the PEFC 40 is high.

In the construction shown in FIG. 8, the area surrounded by an alternate long and short dash line 82 can also be considered as a carbon monoxide reducing device 100b. That is, the carbon monoxide reducing device 100b includes the CO oxidation portion 58, an oxygen supplying device 50 and the control portion 60a. The CO oxidation portion 58 produces carbon dioxide by oxidizing carbon monoxide contained in the reformate gas that is obtained through reformation of fuel gas by means of a reforming catalyst. The oxygen supplying device 50 supplies the CO oxidation portion 58 with oxygen together with reformate gas. The control portion 60a controls an amount of oxygen supplied to the CO oxidation portion 58 in accordance with an amount of reformate gas supplied thereto. The electronic control unit 60 incorporates the control portion 60a. By controlling an amount of oxygen supplied to the CO oxidation portion 58 in accordance with an amount of reformate gas supplied thereto, it is possible to simplify temperature control of the CO oxidation portion 58, which determines response performance of an oxidation reaction of CO, and to continuously control the oxidation reaction.

A fourth embodiment of the present invention will now be described with reference to the drawings.

FIG. 10 shows the construction of a carbon monoxide reducing device 100c according to a fourth embodiment of the present invention.

The carbon monoxide reducing device 100c is provided with a CO oxidation portion 128, an oxygen supplying device 150 and the electronic control unit 60. The CO oxidation portion 128 produces carbon dioxide by selectively oxidizing carbon monoxide (CO) contained in the reformate gas (gas with a high concentration of hydrogen) that is obtained through reformation of fuel gas by means of a reforming catalyst. The oxygen supplying device 150 supplies the CO oxidation portion 128 with oxygen together with reformate gas. The electronic control unit 60 controls an amount of oxygen supplied to the CO oxidation portion 128 in accordance with an amount of reformate gas supplied thereto.

The CO oxidation portion 128 includes CO oxidation units 128a and 128b, which are disposed along a direction in which reformate gas flows. The CO oxidation units 128a and 128b are arranged in series. That is, reformate gas first passes through the CO oxidation unit 128a and then passes through the CO oxidation unit 128b. Each of the CO oxidation units 128a and 128b has a catalyst for an oxidation reaction wherein carbon dioxide is produced by oxidizing the carbon monoxide contained in the reformate gas. Reformate gas is supplied to the catalyst, whereby the oxidation reaction of CO proceeds.

The oxygen supplying portion 150 includes oxygen supplying units 150a and 150b, which are provided in correspondence with the CO oxidation units 128a and 128b, respectively. The oxygen supplying unit 150a supplies the CO oxidation unit 128a with oxygen, whereas the oxygen supplying unit 150b supplies the CO oxidation unit 128b with oxygen. For example, the oxygen supplying units 150a and 150b are air pumps for delivering air.

The amount of oxygen supplied to the CO oxidation unit 128a and the amount of oxygen supplied to the CO oxidation unit 128b are controlled independently of each other, in accordance with a flow rate of reformate gas. The flow rate of reformate gas can be measured using, for example, a flow meter.

Figure 11A:
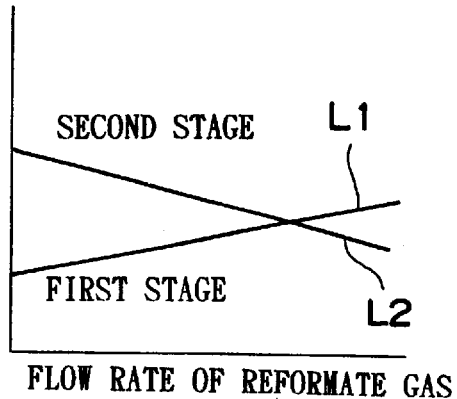
FIG. 11A shows a relationship between the flow rate of reformate gas and the O/CO rate.
Figure 11B:
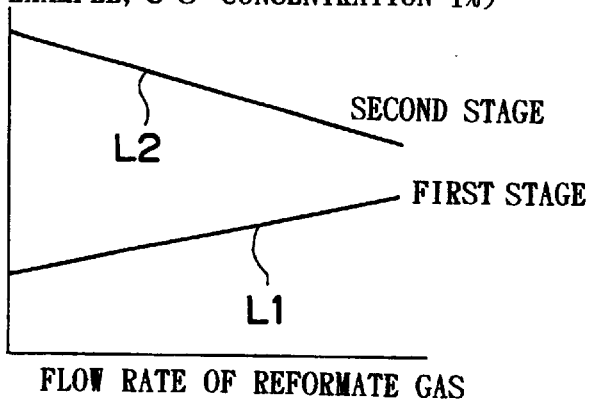
FIG. 11B shows a relationship between the flow rate of reformate gas and the O/CO rates at respective units.

FIG. 11A shows a relationship between the amount of reformate gas supplied to the CO oxidation unit 128a and the O/CO ratio at the CO oxidation unit 128a, and FIG. 11B shows a relationship between the amount of reformate gas supplied to the CO oxidation unit 128b and the O/CO ratio at the CO oxidation unit 128b. Referring to FIGS. 11A and 11B, the relationship at the CO oxidation unit 128a on the first stage is represented by a solid line L1, and the relationship at the CO oxidation unit 128b on the second stage is represented by a solid line L2.

The electronic control unit 60 controls O/CO ratios at the CO oxidation units 128a and 128b in such a manner as to satisfy the relationships shown in FIGS. 11A and 11B.

In the case where the reformate gas supplied to the CO oxidation portion 128 contains a relatively high concentration of CO, it is preferable to control O/CO ratios at the CO oxidation units 128a and 128b in such a manner as to satisfy the relationship shown in FIG. 11A. For example, if the concentration of CO in the reformate gas supplied to the CO oxidation portion 128 is about 5% (e.g., if natural gas is used as fuel), the O/CO ratios at the CO oxidation units 128a and 128b are controlled in such a manner as to satisfy the relationship shown in FIG. 11A.

In the case where the reformate gas supplied to the CO oxidation portion 128 contains a relatively low concentration of CO, it is preferable to control O/CO ratios at the CO oxidation units 128a and 128b in such a manner as to satisfy the relationship shown in FIG. 11B. For example, if the concentration of CO in the reformate gas supplied to the CO oxidation portion 128 is about 1% (e.g., if methanol gas is used as fuel), the O/CO ratios at the CO oxidation units 128a and 128b are controlled in such a manner as to satisfy the relationship shown in FIG. 11B.

The control of the O/CO ratio in the CO oxidation unit 128a is achieved by detecting a concentration of CO at the CO oxidation unit 128a and adjusting an amount of oxygen supplied to the CO oxidation unit 128a based on the detected concentration of CO. A CO sensor 152a detects a concentration of carbon monoxide. For example, the CO sensor 152a is provided in the vicinity of an inlet of the CO oxidation unit 128a.

The control of the O/CO ratio in the CO oxidation unit 128b is achieved by detecting a concentration of carbon monoxide at the CO oxidation unit 128b and adjusting an amount of oxygen supplied to the CO oxidation unit 128b based on the detected concentration of carbon monoxide. A CO sensor 152b detects a concentration of carbon monoxide. For example, the CO sensor 152b is provided in the vicinity of an inlet of the CO oxidation unit 128b.

In this manner, a control portion 60 controls amounts of oxygen supplied to the CO oxidation units 128a and 128b such that the CO oxidation units 128a and 128b exhibit mutually different characteristics of the O/CO ratio. In particular, it is preferable to set the entire level of the O/CO ratio higher as the concentration of CO at the inlet of the CO oxidation unit 128b on the second stage becomes lower.

As shown in FIGS. 11A and 11B, the amounts of oxygen supplied to the CO oxidation units 128a and 128b are controlled such that the O/CO ratio at the CO oxidation unit 128a on the first stage increases and the O/CO ratio at the CO oxidation unit 128b on the second stage decreases in accordance with an increase in flow rate of reformate gas.

Because of such control, the efficiency in oxidizing carbon monoxide is enhanced as the load applied to the CO oxidation unit 128a on the first stage decreases, and surplus hydrogen is prevented from burning. Consequently, the efficiency in reducing carbon monoxide is enhanced. In principle, the flow rate of reformate gas is small under a low load. Therefore, even if the amount of oxygen is small, it is possible to reduce a concentration of carbon monoxide. In the CO oxidation unit 128b on the second stage, the amount of carbon monoxide, which tends to be generated through a reverse shift reaction under a low load, can be prevented from generating by increasing an amount of supply of oxygen. As a result, the effect resulting from the reverse shift reaction is reduced, so that the efficiency in reducing a concentration of carbon monoxide is enhanced.

For example, it is assumed that the concentration of CO in the reformate gas supplied to the CO oxidation portion 128 is about 5%. In this case, when the load applied is low, a control operation is performed, for example, such that the O/CO ratio at the CO oxidation unit 128a on the first stage becomes 1 and that the O/CO ratio at the CO oxidation unit 128b on the second stage becomes 4. Thereby, the concentration of CO at the outlet of the CO oxidation unit 128a on the first stage is reduced down to about 2%, and the concentration of CO at the outlet of the CO oxidation unit 128b on the second stage is reduced down to about 100 ppm. On the other hand, when the load applied is high, a control operation is performed, for example, such that the O/CO ratio at the CO oxidation unit 128a on the first stage becomes 4 and that the O/CO ratio at the CO oxidation unit 128b on the second stage becomes 3. Thereby, the concentration of CO at the outlet of the CO oxidation unit 128a on the first stage is reduced down to about 1%, and the concentration of CO at the outlet of the CO oxidation unit 128b on the second stage is reduced down to about 100 ppm.

Figure 12:
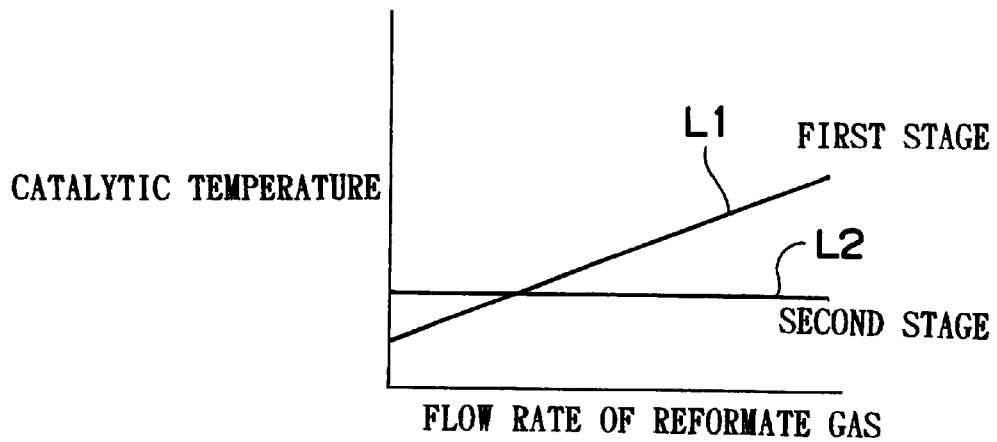
FIG. 12 shows a relationship between the flow rate of reformate gas and the catalytic temperature.

FIG. 12 shows a relationship between the amount of reformate gas supplied to the CO oxidation unit 128a and the catalytic temperature thereof, and a relationship between the amount of reformate gas supplied to the CO oxidation unit 128b and the catalytic temperature thereof. Referring to FIG. 12, the relationship in the CO oxidation unit 128a on the first stage is represented by a solid line L1, and the relationship in the CO oxidation unit 128b is represented by a solid line L2.

The control portion 60 controls catalytic temperatures of the CO oxidation units 128a and 128b in such a manner as to satisfy the relationships shown in FIG. 12.

As shown in FIG. 12, the catalytic temperatures of the CO oxidation units 128a and 128b are controlled such that the catalytic temperature of the CO oxidation unit 128a on the first stage increases with increases in flow rate of reformate gas and the catalytic temperature of the CO oxidation unit 128b on the second stage is kept constant. The control of the catalytic temperature shown in FIG. 12 can be performed in conjunction with or independently of the control of the O/CO ratios shown in FIGS. 11A and 11B. Such control of the catalytic temperature is achieved, for example, by providing the CO oxidation units 128a and 128b with temperature control mechanisms that are independent from each other. The temperature control mechanisms used herein may include, for example, a cooling system through which coolant is circulated to regulate a rise in temperature resulting from an oxidation reaction (exothermic reaction) of carbon monoxide.

Because of such control, the efficiency in oxidizing carbon monoxide is enhanced as the load applied to the CO oxidation unit 128a on the first stage decreases, and surplus hydrogen is prevented from burning. Consequently, the efficiency in reducing carbon monoxide is enhanced. Further, as the load applied to the CO oxidation portion 128a on the first stage increases, the catalytic temperature rises and it becomes possible to reduce a concentration of CO with a small amount of catalyst. As a result, the amount of catalyst required for the CO oxidation unit 128a on the first stage can be reduced. Thus, it is possible to reduce the size of the CO oxidation unit 128a on the first stage, and to further reduce the overall dimension of the CO oxidation portion 128. Further, in the CO oxidation unit 128b on the second stage, the catalytic temperature is kept constant regardless of a load applied thereto, so that the reverse shift reaction is unlikely to occur. As a result, the effect resulting from the reverse shift reaction can be reduced. It is not necessary that the catalytic temperature of the CO oxidation unit 128b be constant. However, the catalytic temperature of the CO oxidation unit 128b should be controlled only such that the occurrence of the reverse shift reaction in the CO oxidation unit 128b is inhibited.

Figure 13:
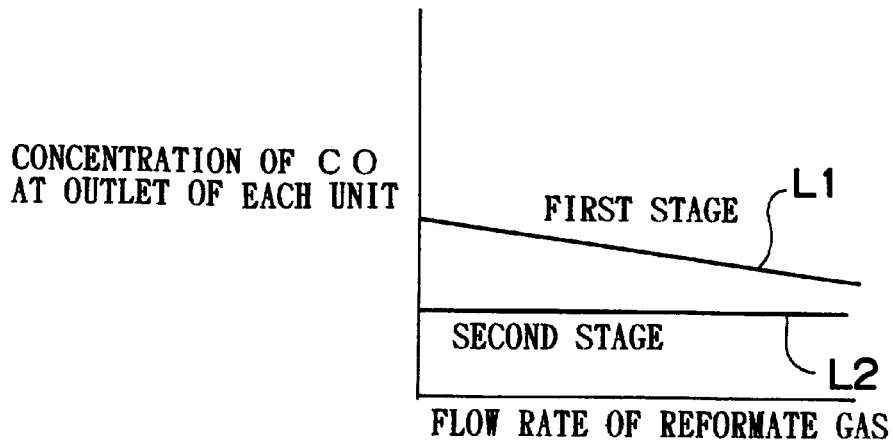
FIG. 13 shows a relationship between the flow rate of reformate gas and the concentrations of carbon monoxide at outlets of the respective units.

FIG. 13 shows a relationship between the amount of reformate gas supplied to the CO oxidation unit 128a and the concentration of CO at the outlet of the CO oxidation unit 128a, and a relationship between the amount of reformate gas supplied to the CO oxidation unit 128b and the concentration of CO at the outlet of the CO oxidation unit 128b. Referring to FIG. 13, the relationship at the CO oxidation unit 128a on the first stage is represented by a solid line L1, and the relationship at the CO oxidation unit 128b on the second stage is represented by a solid line L2.

As shown in FIG. 13, the concentration of CO at the outlet of the CO oxidation unit 128a on the first stage decreases with increases in flow rate of reformate gas, and the concentration of CO at the outlet of the CO oxidation unit 128b on the second stage is kept constant. In this manner, the distribution of the reducing rate of CO can be changed in accordance with a flow rate of reformate gas. This can be achieved, for example, by controlling O/CO ratios as shown in FIGS. 11A and 11B. Alternatively, this can also be achieved by controlling a catalytic temperature as shown in FIG. 12. The control operations with the characteristics shown in FIG. 13 can also be carried out through other methods.

Due to such control operations, as the load applied to the CO oxidation unit 128a decreases, the more gently the oxidation of CO can be carried out. Therefore, the efficiency in oxidizing carbon monoxide is enhanced, and surplus hydrogen is prevented from burning. Consequently, the efficiency in reducing carbon monoxide is enhanced.

The number of selective oxidation units included in the CO oxidation portion 128 is not limited to 2. That is, the CO oxidation portion 128 may include three or more than three oxidation units. For example, in the case where the CO oxidation portion 128 includes N (N≧3) stages of oxidation units, the oxidation unit on the last (the N-th) stage is controlled in the same manner as the oxidation unit 128b. The oxidation units on the other stages (from the first to the (N−1)-th stages) are controlled in the same manner as the oxidation unit 128a.

Instead of the carbon monoxide reducing device 100a shown in FIG. 1, the carbon monoxide reducing device IOOc may be incorporated into the fuel cell system 1a shown in FIG. 6. Instead of the carbon monoxide reducing device 100b shown in FIG. 8, the carbon monoxide reducing device 100c may be incorporated into the fuel cell system 1b shown in FIG. 8.

In the illustrated embodiment, the controller (electronic control unit 37 or 60) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIG. 1 and/or the processes described herein can be used as the controller. A distributed processing architecture can be used for maximum data/signal processing capability and speed.

While the present invention has been described with reference to what is presently considered to be a preferred embodiment thereof, it is to be understood that the present invention is not limited to the disclosed embodiment or construction. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A carbon monoxide reducing device, comprising:
   a carbon monoxide oxidation portion that oxidizes and thereby reduces carbon monoxide gas contained in a reformate gas that is obtained through a reforming reaction;
   an oxygen supplying device that supplies oxygen to the reformate gas so as to oxidize the carbon monoxide gas contained in the reformate gas; and
   an oxygen supply controller that controls a status of the supplied oxygen to the carbon monoxide oxidation portion based on an amount of the reformate gas supplied to the carbon monoxide oxidation portion,
   wherein the oxygen supply controller controls an amount of oxygen supplied to the carbon monoxide oxidation portion such that a ratio of a concentration of oxygen to a concentration of carbon monoxide gas in the carbon monoxide oxidation portion increases with increases in amount of the reformate gas supplied to the carbon monoxide oxidation portion when the amount of the reformate gas supplied to the carbon monoxide oxidation portion is smaller than a predetermined value,
   and controls a pressure in the carbon monoxide oxidation portion such that the pressure in the carbon monoxide oxidation portion increases with increases in amount of the reformate gas supplied to the carbon monoxide oxidation portion when the amount of the reformate gas supplied to the carbon monoxide oxidation portion is greater than the predetermined value.

2. A carbon monoxide reducing device, comprising:
   a carbon monoxide oxidation portion that oxidizes and thereby reduces carbon monoxide gas contained in a reformate gas that is obtained through a reforming reaction;
   an oxygen supplying device that supplies oxygen to the reformate gas so as to oxidize the carbon monoxide gas contained in the reformate gas; and
   an oxygen supply controller that controls a status of the supplied oxygen to the carbon monoxide oxidation portion based on an amount of the reformate gas supplied to the carbon monoxide oxidation portion,
   wherein the status of the supplied oxygen to the carbon monoxide oxidation portion is represented by a pressure in the carbon monoxide oxidation portion.

3. The carbon monoxide reducing device according to claim 2, wherein the oxygen supply controller controls a pressure in the carbon monoxide oxidation portion such that the pressure in the carbon monoxide oxidation portion increases with increases in amount of the reformate gas supplied to the carbon monoxide oxidation portion.

4. A carbon monoxide reducing device, comprising:
   a carbon monoxide oxidation portion that oxidizes and there by reduces carbon monoxide gas contained in a reformate gas that is obtained through a reforming reaction, wherein the carbon monoxide oxidation portion includes a plurality of selective oxidation units disposed along a direction in which the reformate gas flows, each of the selective oxidation units oxidizing carbon monoxide gas contained in the reformate gas;
   an oxygen supplying device that supplies oxygen to the reformate gas so as to oxidize the carbon monoxide gas contained in the reformate gas, the oxygen supplying device includes a plurality of oxygen supplying units that are provided in correspondence with the plurality of selective oxidation units, the oxygen supplying units supplying the respective selective oxidation units with oxygen together with the reformate gas; and
   an oxygen supply controller that controls a status of the supplied oxygen to the carbon monoxide oxidation portion based on an amount of the reformate gas supplied to the carbon monoxide oxidation portion, the oxygen supply controller controls amounts of oxygen supplied to the respective selective oxidation units in accordance with amounts of the reformate gas supplied to the respective selective oxidation units.

5. The carbon monoxide reducing device according to claim 4, wherein the oxygen supply controller controls amounts of oxygen supplied to the respective selective oxidation units such that ratios between concentrations of oxygen and carbon monoxide in at least two of the selective oxidation units differ from each other.

6. The carbon monoxide reducing device according to claim 4, wherein the oxygen supply controller controls a catalytic temperature of at least one of the selective oxidation units in accordance with amounts of the reformate gas supplied to the respective selective oxidation units.

7. The carbon monoxide reducing device according to claim 4, wherein the selective oxidation units are arranged in series.

* * * * *